(12) United States Patent
Glenn

(10) Patent No.: US 7,958,766 B2
(45) Date of Patent: Jun. 14, 2011

(54) SELF-ALIGNING TOOLS AND A MANDREL WITH RETENTION SLEEVE

(75) Inventor: Douglas W. Glenn, Des Moines, WA (US)

(73) Assignee: Fatigue Technology, Inc., Seattle, WA (US)

( * ) Notice: Subject to any disclaimer, the term of this patent is extended or adjusted under 35 U.S.C. 154(b) by 803 days.

(21) Appl. No.: 11/824,559

(22) Filed: Jun. 29, 2007

(65) Prior Publication Data

US 2008/0034831 A1    Feb. 14, 2008

Related U.S. Application Data

(60) Provisional application No. 60/818,133, filed on Jun. 29, 2006.

(51) Int. Cl.
*B21D 31/00* (2006.01)
(52) U.S. Cl. ............ 72/391.2; 72/391.4; 72/393; 29/523
(58) Field of Classification Search .................. 72/391.2, 72/391.4, 391.6, 393; 29/243.522, 243.528, 29/243.529, 523, 524.1, 525
See application file for complete search history.

(56) References Cited

U.S. PATENT DOCUMENTS

| | | |
|---|---|---|
| 295,593 A | 3/1884 | Thayer |
| 810,430 A | 1/1906 | Pfluger et al. |
| 1,081,496 A | 12/1913 | Gillmor |
| 1,106,964 A | 8/1914 | Pahler |
| 1,226,090 A | 5/1917 | Ludlum |
| 1,297,142 A | 3/1919 | Gibbons |
| 1,480,298 A | 1/1924 | Pearson |
| 1,881,867 A | 10/1932 | Nelson |
| 1,979,686 A | 11/1934 | Hall et al. ......................... 85/40 |
| 2,092,358 A | 9/1937 | Robertson ....................... 285/56 |
| 2,146,461 A | 2/1939 | Bettington ...................... 218/29 |
| 2,150,361 A | 3/1939 | Chobert ........................... 153/79 |
| 2,188,596 A | 1/1940 | Hobert ............................... 16/2 |
| 2,275,451 A | 3/1942 | Maxwell ..................... 29/157.5 |

(Continued)

FOREIGN PATENT DOCUMENTS

DE        2203217        7/1973

(Continued)

OTHER PUBLICATIONS

Merriam Webster's Collegiate Dictionary, Tenth Edition, 1997, p. 154. European Search Report, mailed on Aug. 16, 2010 for EP07111479.7, 8 pages, which is the European counterpart to the present U.S. Appl. No. 11/824,559.
U.S. Appl. No. 09/603,857, filed Jun. 26, 2000, Skinner et al.

* cited by examiner

*Primary Examiner* — David B Jones
(74) *Attorney, Agent, or Firm* — Seed Intellectual Property Law Group PLLC

(57) ABSTRACT

Self-aligning tools may be used to install and reposition an expandable structure in a workpiece. A self-aligning installation system may include an expansion mandrel, self-aligning nose cap assembly, and an installation tool for driving the mandrel. The expansion mandrel is sized to fit within a passageway of an expandable member such that the expandable member radially expands when the expansion mandrel is moved through the passageway. The self-aligning nose cap assembly moves relative to the installation tool and mandrel. A self-aligning seating system can be used to move the installed expandable member. The self-aligning seating system includes a seat backing, a seat base, and a pull rod coupled to the seat backing and extending through the seat base. The seat backing slidably engages the seat base to permit rotation of the pull rod.

33 Claims, 19 Drawing Sheets

U.S. PATENT DOCUMENTS

| | | | |
|---|---|---|---|
| 2,357,123 A | 8/1944 | Maxwell | 153/80.5 |
| 2,385,294 A | 9/1945 | Lowy | 16/3 |
| 2,405,399 A | 8/1946 | Bugg et al. | 153/80 |
| 2,430,554 A | 11/1947 | Bugg et al. | 153/80 |
| 2,433,425 A | 12/1947 | Burckle | 285/84 |
| 2,468,985 A | 5/1949 | Krotz | 287/85 |
| 2,528,180 A | 10/1950 | Roehl | 248/56 |
| 2,661,182 A | 12/1953 | Kipp | 251/76 |
| 2,672,175 A | 3/1954 | Howard | 153/80 |
| 2,695,446 A | 11/1954 | Meyer | 29/523 |
| 2,700,172 A | 1/1955 | Rohe | 16/2 |
| 2,808,643 A | 10/1957 | Weatherhead, Jr. | 29/508 |
| 2,943,667 A | 7/1960 | Ewing et al. | 153/80 |
| 3,128,999 A | 4/1964 | Schmitt | 267/1 |
| 3,137,887 A | 6/1964 | Mannino et al. | 16/2 |
| 3,149,860 A | 9/1964 | Hallesy | 285/18 |
| 3,164,054 A | 1/1965 | Biesecker | 85/8.8 |
| 3,244,034 A | 4/1966 | Severdia | 77/62 |
| 3,252,493 A | 5/1966 | Smith | 151/41.7 |
| 3,345,730 A | 10/1967 | Laverty | 29/243.52 |
| 3,358,492 A | 12/1967 | Richter | 72/393 |
| 3,434,746 A | 3/1969 | Watts | 285/162 |
| 3,498,648 A | 3/1970 | Hallesy | 285/343 |
| 3,537,163 A | 11/1970 | Steidl | 29/149.5 |
| 3,566,662 A | 3/1971 | Champoux | 72/370 |
| 3,674,292 A | 7/1972 | Demler, Sr. | 285/174 |
| 3,693,247 A | 9/1972 | Brown | 29/512 |
| 3,778,090 A | 12/1973 | Tobin | 285/222 |
| 3,787,945 A | 1/1974 | Pasek et al. | 29/157.4 |
| 3,820,297 A | 6/1974 | Hurd | 52/758 F |
| 3,835,525 A | 9/1974 | King, Jr. | 29/412 |
| 3,875,649 A | 4/1975 | King, Jr. | 29/418 |
| 3,892,121 A | 7/1975 | Champoux et al. | 72/393 |
| 3,895,409 A | 7/1975 | Kwatonowski | 16/2 |
| 3,915,052 A | 10/1975 | Ruhl | 85/7 |
| 3,934,325 A | 1/1976 | Jaffe | 29/243.52 |
| 3,949,535 A | 4/1976 | King, Jr. | 52/758 D |
| 3,997,193 A | 12/1976 | Tsuda et al. | 285/47 |
| 4,143,580 A | 3/1979 | Luhm | 85/77 |
| 4,164,807 A | 8/1979 | King, Jr. | 29/523 |
| 4,187,708 A | 2/1980 | Champoux | 72/30 |
| 4,249,786 A | 2/1981 | Mahoff | 339/15 |
| 4,355,612 A | 10/1982 | Luksch | 123/41.08 |
| 4,386,515 A | 6/1983 | Starke | 72/391 |
| 4,397,061 A | 8/1983 | Kanzaka | 16/2 |
| 4,405,256 A | 9/1983 | King, Jr. | 403/408 |
| 4,423,619 A | 1/1984 | Champoux | 72/393 |
| 4,425,780 A | 1/1984 | Champoux | 72/370 |
| 4,447,944 A | 5/1984 | Mohrman | 29/512 |
| 4,471,643 A | 9/1984 | Champoux et al. | 72/391 |
| 4,482,089 A | 11/1984 | Lindahl et al. | 228/173 C |
| 4,522,378 A | 6/1985 | Nelson | 267/141.4 |
| 4,524,600 A | 6/1985 | Champoux et al. | 72/391 |
| 4,530,527 A | 7/1985 | Holmberg | 285/382.4 |
| 4,557,033 A | 12/1985 | Champoux | 29/525 |
| 4,583,388 A | 4/1986 | Hogenhout | 72/393 |
| 4,597,282 A | 7/1986 | Hogenhout | 72/370 |
| 4,640,479 A | 2/1987 | Shely et al. | 248/56 |
| 4,665,732 A | 5/1987 | Hogenhout | 72/393 |
| 4,699,212 A | 10/1987 | Andersson et al. | 165/167 |
| 4,759,237 A | 7/1988 | Fauchet et al. | 81/53.2 |
| 4,787,793 A | 11/1988 | Harris | 411/339 |
| 4,809,420 A | 3/1989 | Landy et al. | 29/523 |
| 4,869,091 A | 9/1989 | Shemeta | 72/393 |
| 4,885,829 A | 12/1989 | Landy | 29/156.8 R |
| 4,905,766 A | 3/1990 | Dietz et al. | 169/91 |
| 4,934,038 A | 6/1990 | Caudill | 29/523 |
| 4,934,170 A | 6/1990 | Easterbrook et al. | 72/393 |
| 4,985,979 A | 1/1991 | Speakman | 29/512 |
| 4,999,896 A | 3/1991 | Mangus et al. | 29/34 B |
| 5,038,596 A | 8/1991 | Noonan et al. | 72/391.4 |
| 5,069,586 A | 12/1991 | Casey | 411/339 |
| 5,083,363 A | 1/1992 | Ransom et al. | 29/523 |
| 5,093,957 A | 3/1992 | Do | 16/2 |
| 5,096,349 A | 3/1992 | Landy et al. | 411/108 |
| 5,103,548 A | 4/1992 | Reid et al. | 29/507 |
| 5,110,163 A | 5/1992 | Benson et al. | 285/382.2 |
| 5,127,254 A | 7/1992 | Copple et al. | 72/370 |
| 5,129,253 A | 7/1992 | Austin et al. | 72/370 |
| 5,207,461 A | 5/1993 | Lasko | 285/222 |
| 5,218,854 A | 6/1993 | Jarzebowicz et al. | 72/370 |
| 5,245,743 A | 9/1993 | Landy et al. | 29/523 |
| 5,253,773 A | 10/1993 | Choma et al. | 230/86.2 |
| 5,305,627 A | 4/1994 | Quincey et al. | 72/370 |
| 5,341,559 A | 8/1994 | Reid et al. | 29/523 |
| 5,380,111 A | 1/1995 | Westrom | 402/74 |
| 5,380,136 A | 1/1995 | Copple et al. | 411/183 |
| 5,390,808 A | 2/1995 | Choma et al. | 220/86.2 |
| 5,405,228 A | 4/1995 | Reid et al. | 411/183 |
| 5,433,100 A | 7/1995 | Easterbrook et al. | 72/391.2 |
| 5,466,016 A | 11/1995 | Briody et al. | 285/204 |
| 5,478,122 A | 12/1995 | Seabra | 285/281 |
| 5,607,194 A | 3/1997 | Ridenour | 285/334.5 |
| 5,609,434 A | 3/1997 | Yehezkieli et al. | 403/260 |
| 5,713,611 A | 2/1998 | Kurimoto et al. | 285/382.5 |
| 5,722,312 A | 3/1998 | Kristensen | 92/171.1 |
| 5,806,173 A | 9/1998 | Honma et al. | 29/727 |
| 5,885,318 A | 3/1999 | Shimizu et al. | 65/493 |
| 5,943,898 A * | 8/1999 | Kuo | 72/370.07 |
| 5,947,326 A | 9/1999 | O'Hern et al. | 220/802 |
| 6,058,562 A | 5/2000 | Satou et al. | 16/2.1 |
| 6,131,964 A | 10/2000 | Sareshwala | 285/382 |
| 6,217,082 B1 | 4/2001 | Orcutt et al. | 285/272 |
| 6,266,991 B1 | 7/2001 | Kuo | 72/370.07 |
| 6,289,577 B1 | 9/2001 | Tanaka et al. | 29/603.03 |
| 6,328,513 B1 | 12/2001 | Niwa et al. | 411/339 |
| 6,347,663 B1 | 2/2002 | Hunzinger et al. | 165/178 |
| 6,488,460 B1 | 12/2002 | Smith et al. | 411/353 |
| 6,499,926 B2 | 12/2002 | Keener | 411/504 |
| 6,623,048 B2 | 9/2003 | Castel et al. | 285/382 |
| 6,651,301 B1 * | 11/2003 | Liu | 29/243.521 |
| 6,705,149 B2 | 3/2004 | Cobzaru et al. | 72/391.4 |
| 6,761,380 B2 | 7/2004 | Pachciarz et al. | 285/204 |
| 6,773,039 B2 | 8/2004 | Muenster et al. | 285/259 |
| 6,796,765 B2 | 9/2004 | Kosel et al. | 415/142 |
| 6,826,820 B2 | 12/2004 | Denham et al. | 29/524.1 |
| RE38,788 E | 9/2005 | Satou et al. | 16/2.1 |
| 7,024,908 B2 | 4/2006 | Poast et al. | 72/391.2 |
| 7,047,596 B2 | 5/2006 | Sucic et al. | 16/2.1 |
| 7,059,816 B2 | 6/2006 | Toosky | 411/181 |
| 7,100,264 B2 | 9/2006 | Skinner et al. | 29/523 |
| 7,406,777 B2 | 8/2008 | Grover et al. | 33/645 |
| 7,617,712 B2 | 11/2009 | Glenn | 72/391.4 |
| 2004/0111864 A1 | 6/2004 | Skinner et al. | 29/523 |
| 2005/0025601 A1 | 2/2005 | Poast et al. | 411/15 |
| 2007/0100541 A1 | 5/2007 | Rawlins et al. | 411/54.1 |
| 2007/0289351 A1 | 12/2007 | Glenn | 72/370.07 |
| 2008/0005887 A1 | 1/2008 | Glenn et al. | 29/523 |
| 2008/0066518 A1 | 3/2008 | Glenn et al. | 72/370.07 |
| 2008/0250603 A1 | 10/2008 | Skinner et al. | 16/2.2 |

FOREIGN PATENT DOCUMENTS

| | | |
|---|---|---|
| DE | 33 01 849 C1 | 7/1984 |
| DE | 3545554 A1 | 7/1987 |
| DE | 89 01 317 U1 | 3/1989 |
| EP | 0 054 592 A1 | 6/1982 |
| EP | 0 140 516 A1 | 5/1985 |
| EP | 0 248 122 A2 | 12/1987 |
| EP | 0 891 007 A1 | 1/1999 |
| EP | 0 945 919 B1 | 9/1999 |
| EP | 1166951 A1 | 1/2002 |
| EP | 1 202 458 A1 | 5/2002 |
| EP | 1525952 A1 | 4/2005 |
| EP | 1611976 A1 | 1/2006 |
| EP | 1 903 221 A2 | 3/2008 |
| FR | 2645052 | 10/1990 |
| GB | 593607 | 10/1947 |
| GB | 1395009 | 5/1975 |
| GB | 2 239 917 A | 7/1991 |
| JP | 57137031 | 8/1982 |
| JP | 60238046 A | 11/1985 |
| JP | 61157846 | 7/1986 |
| SU | 632463 | 11/1978 |
| WO | 8400120 A1 | 1/1984 |
| WO | 2007082077 A1 | 7/2007 |
| WO | 2007121932 A1 | 11/2007 |

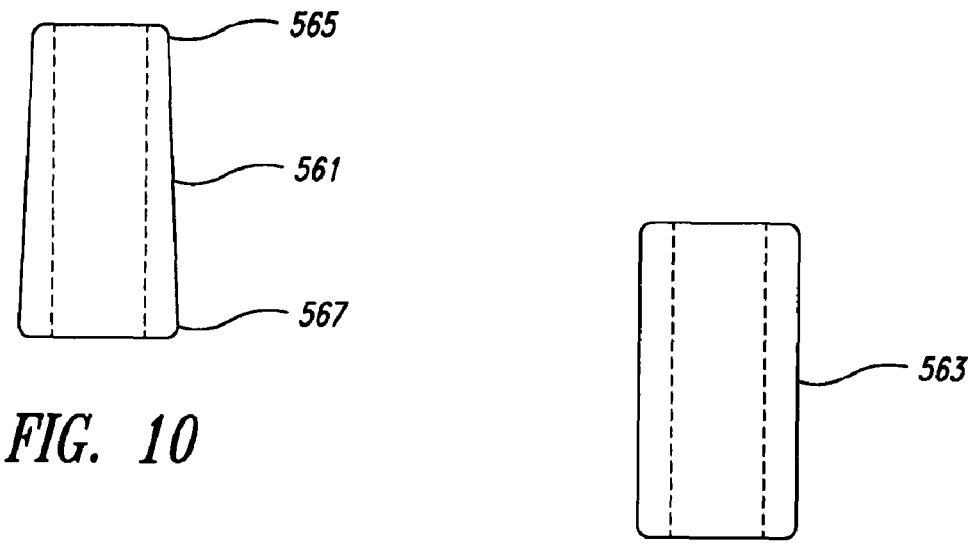
FIG. 10
FIG. 11
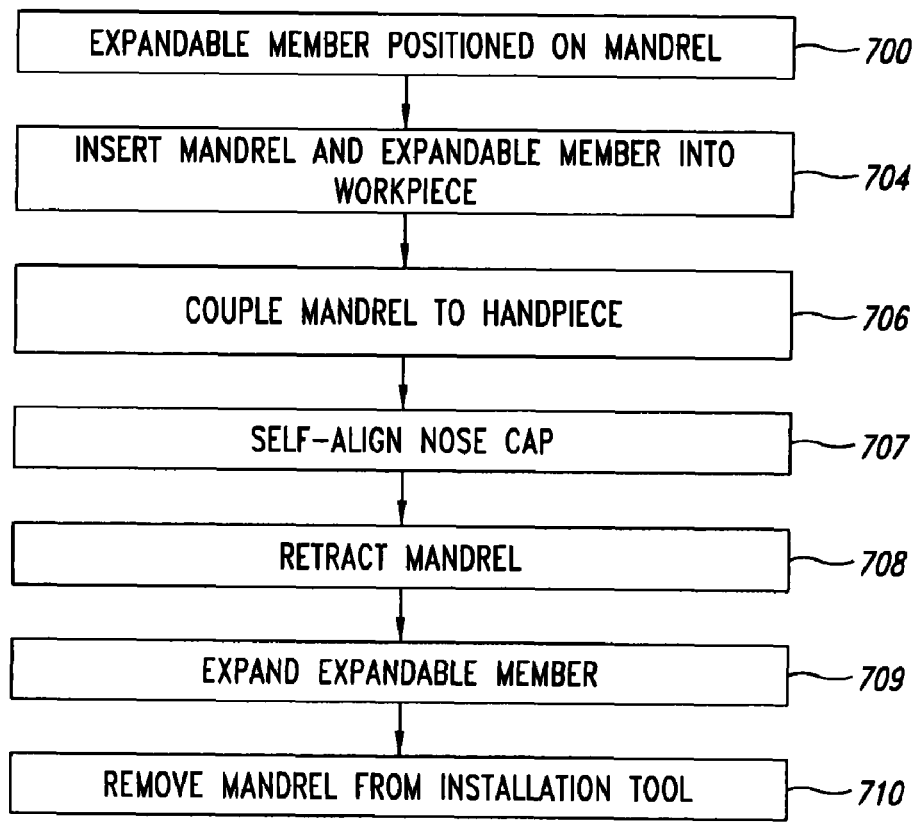
FIG. 12

SELF-ALIGNING TOOLS AND A MANDREL WITH RETENTION SLEEVE

CROSS-REFERENCE TO RELATED APPLICATION

This application claims the benefit under 35 U.S.C. §119(e) of U.S. Provisional Patent Application No. 60/818,133 filed Jun. 29, 2006, which is incorporated herein by reference in its entirety.

BACKGROUND

1. Field of the Disclosure

This disclosure generally relates to self-aligning tools with mandrels and methods of using the same for installing and positioning expandable members, such as expandable bushings.

2. Description of the Related Art

Conventional installation tools are used to install bushings in openings within workpieces. These installation tools often have an expansion mandrel sized to fit within an opening of the bushing. Expansion mandrels are often formed of a hard metal, such as tool steel. After the bushing is slid over the expansion mandrel, the bushing and mandrel are simultaneously inserted into the opening of the workpiece. Unfortunately, an installer may have to manually hold the bushing at a desired position along the mandrel because the bushing may otherwise slide along the mandrel. This may cause complications during the installation process and increase the installation time.

After the bushing and corresponding mandrel are placed in the opening, the mandrel is pushed or pulled through the opening of the bushing to expand the bushing. The bushing is expanded until an interference fit is formed between the bushing and workpiece. During the expansion process, the installation tool must be adequately aligned with the opening in the workpiece in order to reduce side loads applied to the mandrel. For example, if a longitudinally-extending axis of the mandrel is misaligned with a longitudinally-extending axis of the opening, undesirable side loads may be applied to the mandrel. These side loads may cause excessive wear, high localized stresses (e.g., stresses in the workpiece, expandable member, mandrel, etc.), and improper positioning of the bushing. The excess wear can result in frequent part replacement. The high stresses can lead to part failure, such as breaking of the mandrel and/or damage to the workpiece, which can cause manufacturing delays. Thus, side loads can undesirably increase the costs for replacing and maintaining tools, frequency and length of manufacturing delays, and reduce the quality of the installed bushings.

Bushings are often installed in longitudinally-extending holes positioned along angled surfaces of workpieces. That is, the longitudinal axes of the holes are not orthogonal to the surfaces of the workpieces. An installation tool having an angled nose cap may be used to install bushings in these types of holes. The angled nose cap is a unitary structure fixedly coupled to a pull gun. A front face of the nose cap is angled so as to align the mandrel with the longitudinally-extending axis of the hole in the workpiece.

When the angled surface of the nose cap is placed against the surface of the workpiece adjacent the opening, the mandrel can pass through the nose cap and the bushing located in the workpiece. Unfortunately, the user has to select an appropriately angled nose cap for aligning the mandrel with the hole. A single angled nose cap is only suitable for use with a rather narrow range of angles. To select an appropriate angled nose cap, an installer measures the angle defined by the longitudinally-extending axis of the hole in the workpiece and the working surface of the workpiece. An angled nose cap is then selected corresponding to the measured angle. The angled nose caps are often indexed for various surface angles.

Many indexing tools require a minimum surface size for properly taking angle measurements. Unfortunately, the surface angle of the workpiece may be difficult to measure because the area of the surface surrounding the through-hole in the workpiece may be relatively small. Indexing tools may also be unable to measure adequately the curvature of the workpiece's curved surfaces. Additionally, it may be difficult to find any suitable "square" features or edges of the workpiece which are used for orienting the handpiece and associated mandrel. Thus, proper installation of expandable members may be difficult and require complicated measuring equipment.

Additionally, in order to install bushings at different locations, a user may be required to select and use different angled nose caps for use with a single installation tool. Because the installer has to remove and couple various angled nose caps, the installation time can be undesirably long.

In an alternative method, a spacer is used to align a mandrel of an installation tool with a hole in a workpiece. The spacer provides a surface that is perpendicular to a longitudinal axis of the hole. Similar to the angled nose caps, the angle of the workpiece's surface has to be determined before selecting an appropriately sized spacer. Additionally, multiple spacers are often needed for properly installing bushings at different locations.

Consequently, conventional installation tools may not adequately meet certain quality and installation needs.

BRIEF SUMMARY

In some embodiments, an apparatus for installing an expandable member in an opening of a work piece comprises an expansion mandrel sized to fit within a passageway of the expandable member such that the expandable member radically expands when the mandrel moves through the passageway and an installation tool having a distal portion and a drive system. The mandrel moves along a predetermined path when the drive system is activated. A self-aligning nose cap assembly has an opening surrounding the expansion mandrel. The apparatus further includes a joint retractably coupling the self-aligning nose cap assembly and the installation tool such that the self-aligning nose cap assembly moves relative to the distal portion of the installation tool and the mandrel.

In some embodiments, the self-aligning nose cap assembly has an outer surface for engaging the work piece and an opposing curved surface for sliding along a complementary curved outer surface of the distal portion. The nose cap assembly has a partially spherical surface that slid ably engages a complementary partially spherical surface of the distal portion.

In some embodiments, a nose cap assembly for use with a puller device, which actuates an elongated mandrel, comprises an outer housing dimensioned for retractably coupling to a distal portion of the puller device and an engagement portion physically connected to the outer housing. The engagement portion defines a first surface, a second surface opposite the first surface, and an aperture extending between the first surface and the second surface. The aperture is sized to receive the elongated mandrel. The second surface is curved to slid ably engage a curved outer surface of the puller device in response to the first surface being pressed against a work piece.

In some embodiments, an axial cross-section of the aperture is sufficiently large to permit the engagement portion to rest securely against a surface of the work piece. The surface of the work piece is angled to a substantially linear path of travel of the mandrel. In some embodiments, the surface of the work piece and the linear path of travel of the mandrel define an angle less than about, for example, 15 degrees. In some embodiments, the surface of the workpiece and the linear path of travel of the mandrel define an angle of at least 3 degrees. In other embodiments, the surface of the workpiece and the linear path of travel of the mandrel define an angle of at least 2 degrees. In yet other embodiments, the surface of the workpiece and the linear path of travel of the mandrel define an angle of at least 1 degree. In some embodiments, at least a portion of the curved second surface of the engagement portion has substantially the same curvature as at least a portion of the curved outer surface of the puller device. In one embodiment, the second surface of the engagement portion forms a generally partially spherical surface.

In some embodiments, a method of installing a member into a workpiece comprises positioning a mandrel through an opening in the workpiece. The opening defines a longitudinal axis that is not perpendicular to a surface of the workpiece surrounding the opening. A nose cap assembly is pushed against the surface of the workpiece causing rotation of the nose cap assembly relative to the mandrel while the mandrel extends through the opening in the workpiece. The nose cap assembly is rotated a sufficient distance to generally align the mandrel with the longitudinal axis of the opening in response to the pushing.

In some embodiments, the surface of the workpiece and an imaginary plane orthogonal to the longitudinal axis define an angle greater than about 1 degree. In other embodiments, the surface of the workpiece and an imaginary plane orthogonal to the longitudinal axis define an angle greater than about 2 degrees. In other embodiments, the surface of the workpiece and an imaginary plane orthogonal to the longitudinal axis define an angle greater than about 3 degrees. In some embodiments, the method further comprises expanding a member a sufficient amount to form an interference fit between the member and the opening of the workpiece after aligning the mandrel with the longitudinal axis of the opening.

In some embodiments, a mandrel for expanding a member in a workpiece is provided. The mandrel comprises a main body having a tapered portion, a mounting portion, and a coupling portion. The mounting portion is interposed between the tapered portion and the coupling portion. The tapered portion is configured to radially expand the member when the tapered portion is moved through a passageway extending through the member. A retention sleeve is received by the mounting portion of the main body. The retention sleeve is positioned axially along the main body such that the sleeve engages at least a portion of the member when the coupling portion of the main body is coupled to an installation tool. The retention sleeve is generally more compressible than the tapered portion of the main body.

In some embodiments, the retention sleeve is made of a first material having a first modulus of elasticity. The tapered portion is made of a second material having a second modulus of elasticity. The first modulus of elasticity is substantially less than the second modulus of elasticity. The retention sleeve can be comprised of steel (e.g., spring steel), plastics, polymers, wear resistant materials (e.g., nylon), and the like. In some embodiments, the main body comprises mostly metal and the retention sleeve comprises mostly plastic. In some embodiments, the main body is formed mostly of steel and the retention sleeve is formed mostly of rubber.

In yet another embodiment, a method of installing an expandable member comprises placing an expandable member on an expansion mandrel such that at least a portion of the expansion member is held by a retention sleeve of the mandrel. At least a portion of the expandable member is positioned in an opening of a workpiece while the expandable member is held by the retention sleeve. At least a portion of the mandrel is moved through a through-hole in the expandable member to disengage the expandable member and the retention sleeve. The expandable member is expanded by moving a tapered portion of the expansion mandrel through the through-hole of the expandable member. The expandable member is expanded an amount sufficient to form an interference fit with the workpiece. At least a portion of the retention sleeve is more compliant than at least a portion of the tapered portion of the mandrel. In some variations, at least a portion of the retention sleeve is substantially more compliant than one or more portions of the tapered portion. In some variations, at least a portion of the retention sleeve is more compliant than a portion of the expandable member defining the through-hole.

In yet other embodiments, a device for expanding an expandable member comprises means for expanding the expandable member from a first configuration to a second configuration when the means for expanding is moved through an opening in the expandable member, and means for retaining the expandable member in the first configuration on the means for expanding. The means for retaining is coupled to the means for expanding. In some variations, the means for retaining is more compressible than a portion of the means for expanding that expands the expandable member. In one variation, the means for retaining is substantially more compressible than a portion of the means for expanding that expands the expandable member. In some variations, the means for retaining tightly surrounds the means for expanding.

In yet other embodiments, a seating assembly for moving an installed member in a workpiece comprises a seat backing having a first surface and an opposing second surface, an elongated rod sized to fit within a passageway of the member. The elongated rod comprises a first end, a second end, and a body extending between the first end and the second end. The first end of the elongated rod is configured to be coupled to the seat backing. A seat base has an aperture dimensioned to receive the elongated rod, a first surface for engaging the workpiece, and a second surface. The second surface of the seat base and the second surface of the seat backing configured to form a joint which rotatably connects the seat backing and the seat base such that the elongated rod moves with respect to the seat base when the first surface of the seat base engages the workpiece and the rod extends through the aperture of the seat base and the passageway of the member.

In some embodiments, a method of moving a member installed in a workpiece comprises inserting a coupling end of an elongated rod through a through-hole of the member. The coupling end of the elongated rod is coupled to a puller tool such that the member and workpiece are at least partially sandwiched between a seat base surrounding the rod and the puller tool. The elongated rod is rotated about a joint formed by a seat backing and the seat base. The elongated rod is rotated an amount sufficient to align the elongated rod with a longitudinal axis of the through-hole. The elongated rod is pulled towards the puller tool with sufficient force to move the member relative to the workpiece.

In some embodiments, a system for positioning a member installed in a workpiece is provided. The system comprises a seat backing, a rod, and a seat base. The rod extends from the seat backing. The rod has a coupling end and a main body extending between the seat backing and the coupling end. The coupling end is coupleable to a puller device. The seat base has an opening configured to receive the main body of the rod. The seat base and seat backing cooperate to allow the rod to move laterally in a through-hole in a member installed in a workpiece when the seat base is pulled against the workpiece.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 10 is a side elevational view of a retention sleeve, according to another illustrated embodiment.

FIG. 11 is a side elevational view of a retention sleeve, according to yet another illustrated embodiment.

FIG. 12 is a flowchart showing a method of installing an expandable member according to one embodiment.

DETAILED DESCRIPTION

In the following description, certain specific details are set forth in order to provide a thorough understanding of various disclosed embodiments. However, one skilled in the art will understand that the disclosed embodiments may be practiced without these details.

Unless the context requires otherwise, throughout the specification and claims which follow, the word "comprise" and variations thereof, such as, "comprises" and "comprising" are to be construed in an open, inclusive sense, that is as "including, but not limited to."

The headings provided herein are for convenience only and do not interpret the scope or meaning of the claimed embodiments. The following description relates to expandable members and installation systems, such as self-aligning installation systems and seating apparatuses for installing the expandable members. For purposes of this description and for clarity, a self-aligning installation system will be described and then a description of its components will follow. Another self-aligning system, namely a seating apparatus for repositioning an installed expandable member, is then described. The terms "proximal" and "distal" are used to describe the illustrated embodiments and are used consistently with the description of non-limiting exemplary applications. The terms proximal and distally are used in reference to the user's body when the user operates an installation system, unless the context clearly indicates otherwise.

Overview of Installation System

Figure 1A:
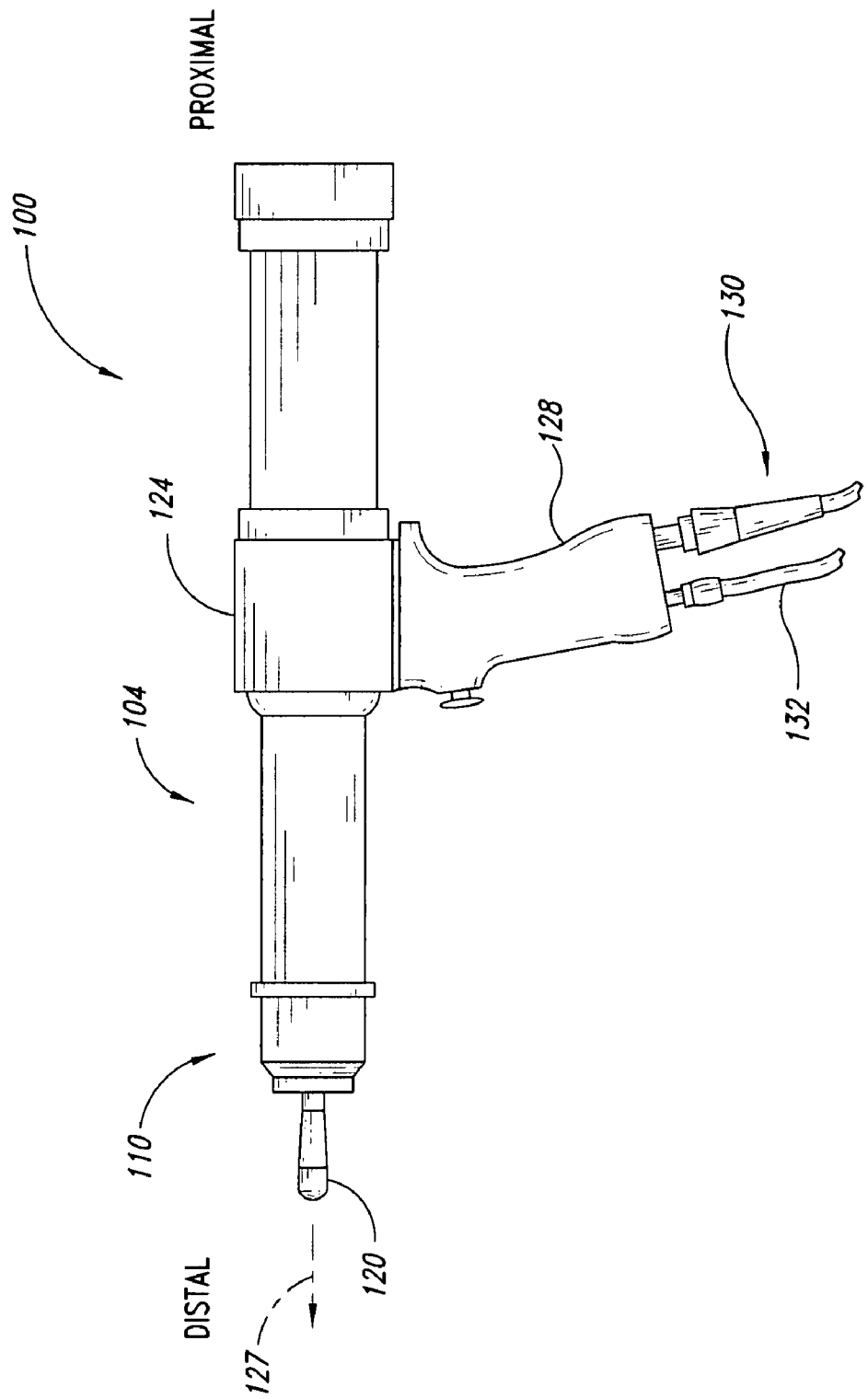
FIG. 1A is a side elevational view of an installation system having a self-aligning nose cap assembly attached to an installation tool and an expansion mandrel for expanding an expandable member, according to one illustrated embodiment.

FIG. 1A shows an installation system 100 including an installation tool 104, a self-aligning nose cap assembly 110, and an expansion mandrel 120 extending outwardly from the nose cap assembly 110. Generally, the installation system 100 can be used to install an expandable member in a hole in a workpiece. The nose cap assembly 110 can move relative to the installation tool 104 and/or mandrel 120 in order to align the mandrel 120 with the expandable member. Proper alignment of the mandrel 120 may reduce, limit, or prevent off-axis loads (e.g., side loads) applied to the mandrel 120 before, during, and/or after an expansion process, as discussed in more detail below. Thus, the installation system 100 can install an expandable member in a hole.

The installation tool 104 includes a main body 124 that is coupled to a grip 128. The user can manually grasp the grip 128 for comfortably holding and accurately positioning the installation system 100. The illustrated grip 128 is a pistol grip. However, other types of grips can be utilized.

The installation tool 104 can be driven electrically, hydraulically, pneumatically, or by any other suitable drive means. In some embodiments, the main body 124 houses a drive system (as described in connection with FIG. 4B) that can drive the mandrel 120, preferably along a predetermined path 127 (e.g., a line of action) in a proximal direction and/or distal direction. A pair of fluid lines 130, 132 provides pressurized fluid (e.g., pressurized gas, liquid, or combinations thereof) to a piston drive system that actuates the mandrel 120. One of ordinary skill in the art can select the type of drive system used to achieve the desired motion of the mandrel 120.

Figure 1B:
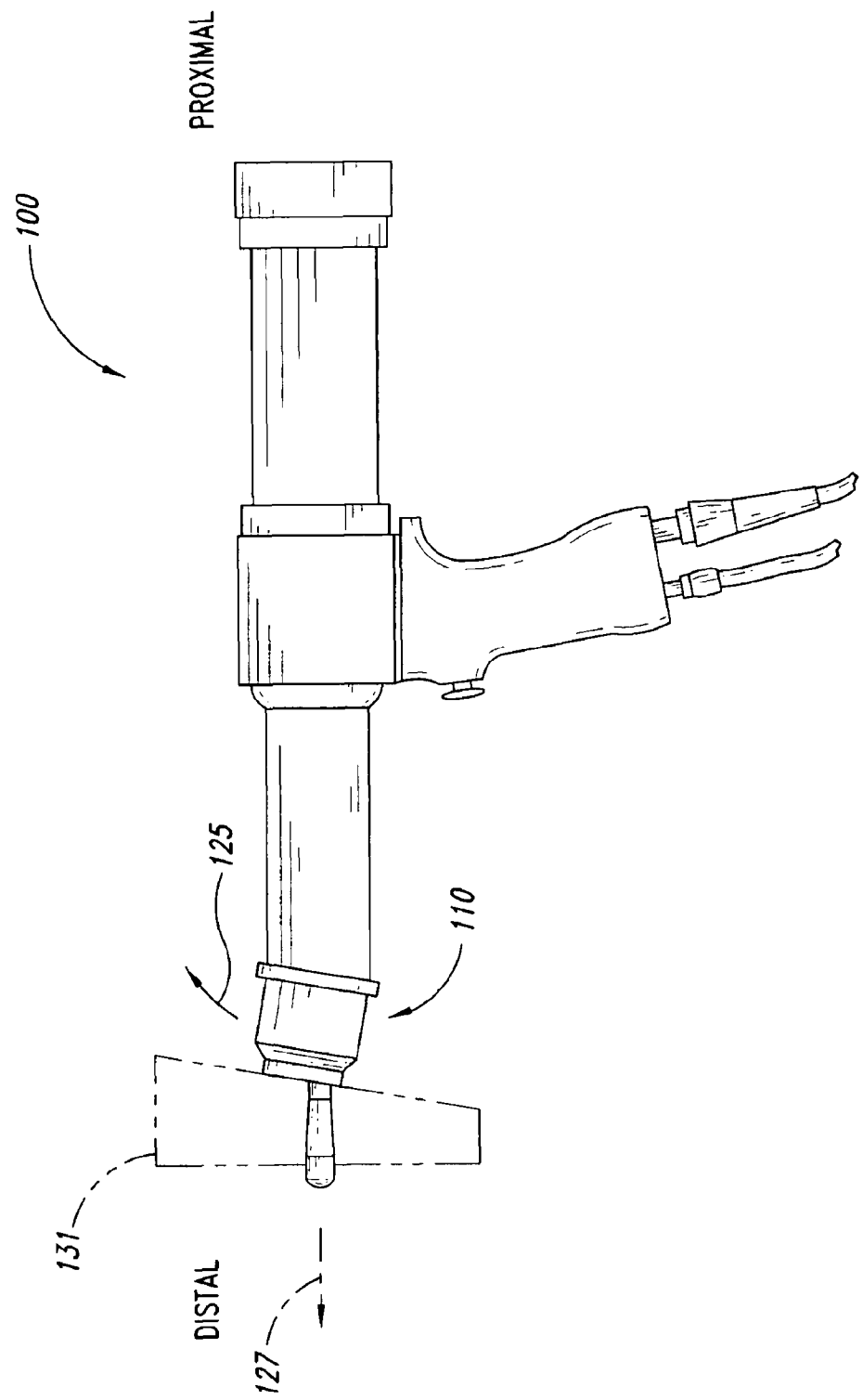
FIG. 1B is a side elevational view of the installation system of FIG. 1A where the self-aligning nose cap assembly engages a workpiece and is rotated to a raised position.
Figure 1C:
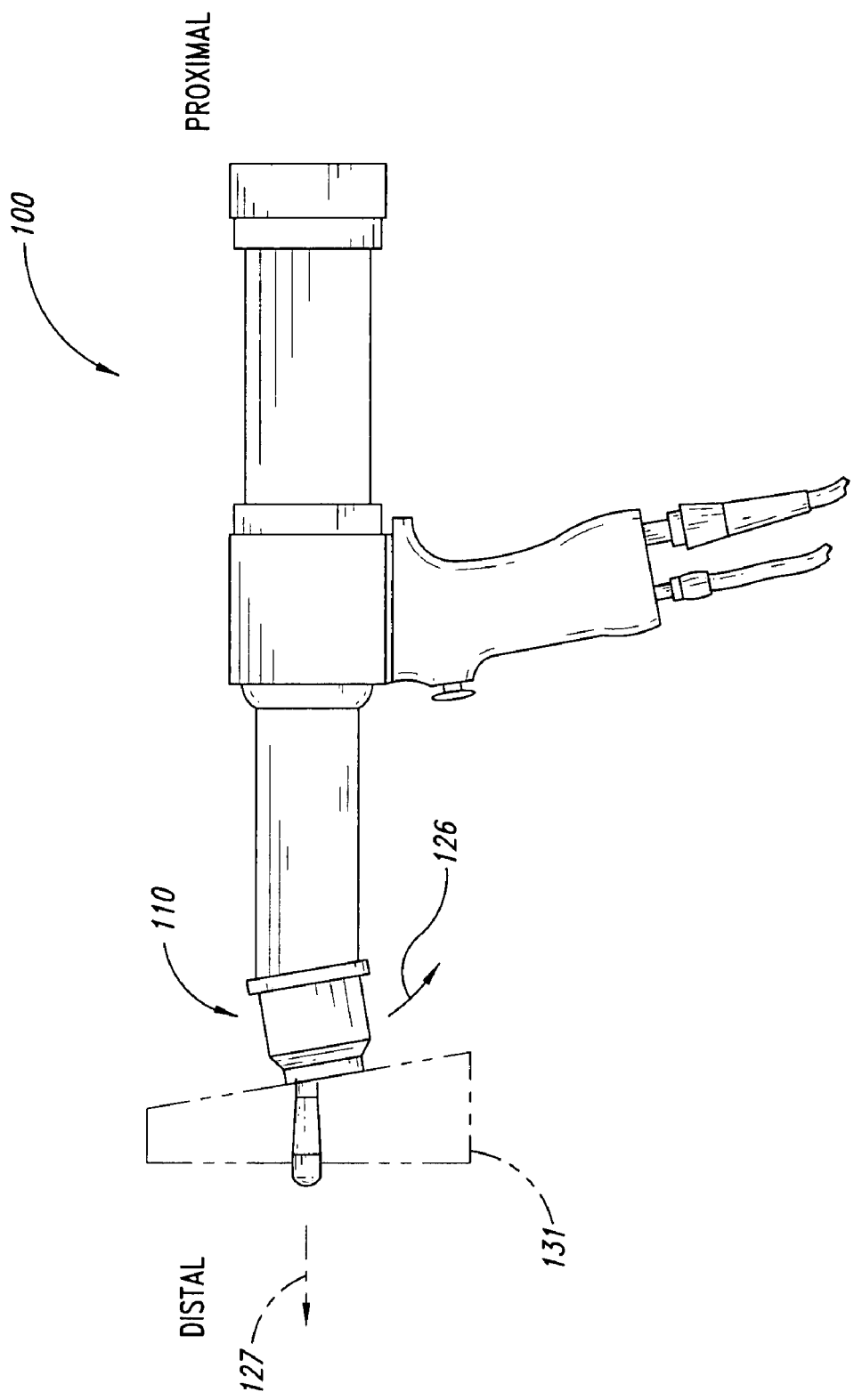
FIG. 1C is a side elevational view of the installation system of FIG. 1A where the self-aligning nose cap assembly engages a workpiece and is rotated to a lowered position.

The cap assembly 110 allows expandable members to be installed in holes that may or may not be perpendicular to a surface of a workpiece. For example, the cap assembly 110 can move to accommodate an angled or curved surface of a workpiece in order to install an expandable member in a hole which is at an oblique angle relative to the surface of the workpiece. To accommodate angled surfaces, the cap assembly 110 can be substantially rotationally unrestrained. As shown in FIG. 1B, the cap assembly 110 can be rotated upwardly (indicated by an arrow 125) to a raised position when engaging a workpiece 131 (shown in phantom). As shown in FIG. 1C, the cap assembly 110 can be rotated downwardly (indicated by an arrow 126) to a lowered position.

One or more joints can be formed between the cap assembly 110 and installation tool 104. As used herein, the term "joint" is a broad term that includes, but is not limited to, the region of contact between two elements that permits relative movement between the two elements. Joints can permit rotational and/or axial movement. In some embodiments, the joint is a structure that physically connects two elements while permitting relative movement between the elements. The term "rotational joint" is a broad term that includes, without limitation, a joint that has at least one rotational degree of freedom with substantially no axial movement in at least one direction. For example, a rotational joint can be in the form of a swivel joint or pivot joint. A pivot joint includes, without limitation, a joint that is generally rotationally unrestrained in at least two rotational degrees of freedom. In some embodiments, a pivot joint is rotationally unrestrained in three rotational degrees of freedom. Joints can have some amount of joint friction and joint elasticity depending on the desired play and movement.

Figure 2:
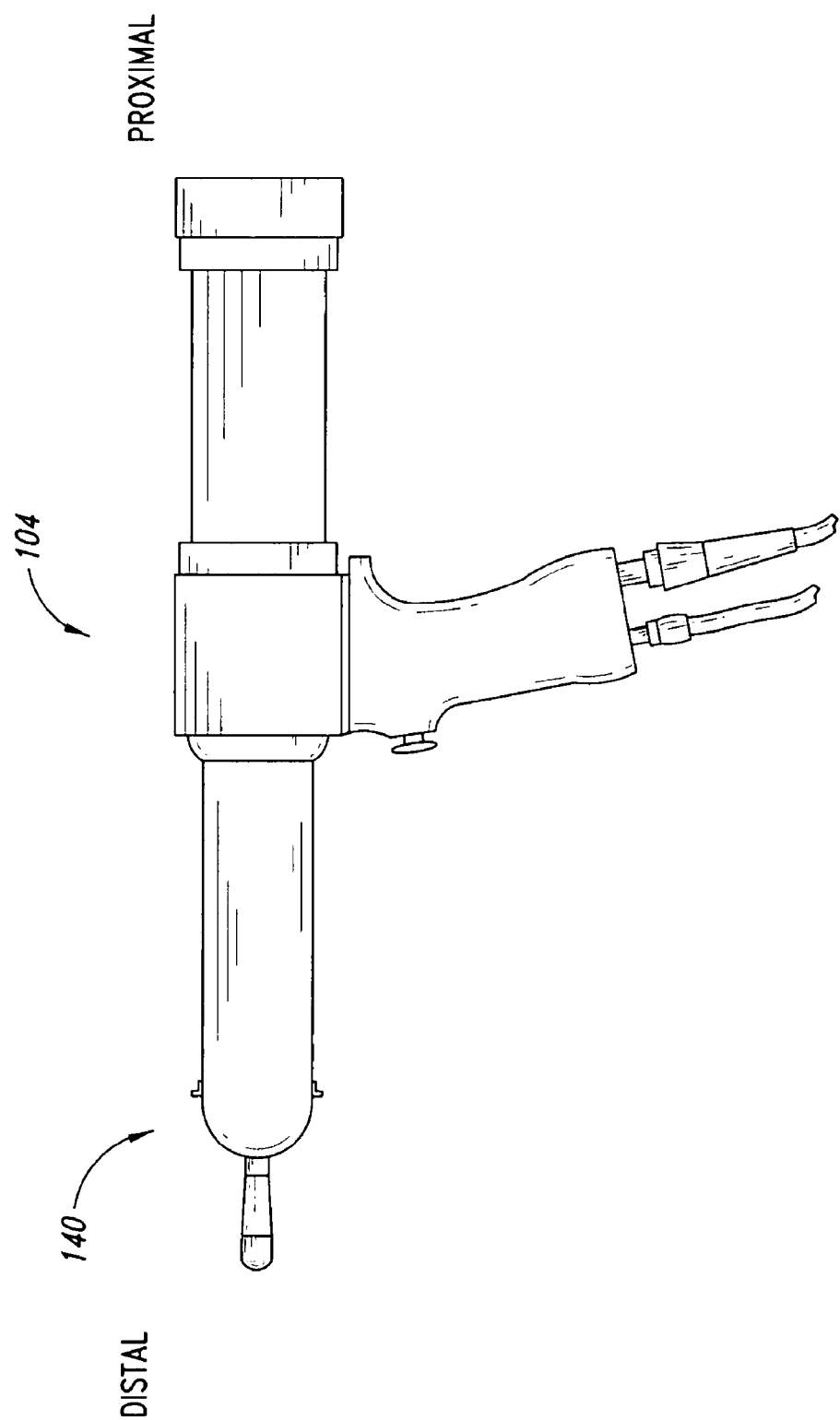
FIG. 2 is a side elevational view of the installation system of FIG. 1A where the self-aligning nose cap assembly has been removed.

The cap assembly 110 of FIG. 1A is slidably coupled to a distal tip or portion 140 (see FIG. 2) of the installation tool 104. The illustrated installation tool 104 is in the form of a handpiece tool. In some embodiments, the cap assembly 110 has three rotational degrees of freedom to provide movement like a ball and socket joint. As shown in FIGS. 1B and 1C, the cap assembly 110 rotates with respect to the mandrel 120 and installation tool 104. During installation of the expandable member, the cap assembly 110 can continuously align the mandrel 120 with the expansion member to ensure proper installation of the expansion member.

The mandrel 120 comprises an elongated body configured to radially expand the expandable member when the mandrel 120 is moved axially through a through-hole in the expandable member. As used herein, the term "mandrel" is a broad term and includes, but is not limited to, an elongated member having at least one tapered portion or expanded portion used to expand an expandable member. In some embodiments, a gradually tapered portion of a mandrel can be used to radially expand the expandable member so as to produce an interference fit between the expandable member and workpiece. Mandrels can have a one-piece or multi-piece construction. In some embodiments, the mandrels have a unitary body. In other embodiments, the mandrels have a multi-piece construction. For example, a mandrel can be a split mandrel and/or may have one or more sleeves, such as the retention sleeves discussed below.

As used herein, the term "expandable member" is a broad term and includes, but is not limited to, a bushing, washer, sleeve (including a split sleeve), fitting, fastener, nut plate, structural expandable member (e.g., expandable members that are incorporated into structural workpieces), and other structures that are suitable for coupling to a workpiece. The expandable member can be expanded from a first configuration to a second configuration. In some embodiments, for example, the expandable member is a bushing that can be radially expanded in order to form an interference fit with a through-hole in a workpiece. Expandable member refers to a member in a pre-expanded state and post-expanded state unless the context clearly dictates otherwise. Various types of expansion processes can be employed to expand the expandable members. In a cold expansion process, for example, the expandable member is radially expanded without appreciably raising the temperature of the expandable member to produce residual stresses in the workpiece and/or expandable member to enhance fatigue performance. The residual stresses are preferably compressive stresses that can minimize, limit, inhibit, or prevent crack initiation and/or crack propagation.

An expandable member can be installed in various types of workpieces. As used herein, the term "workpiece" is broadly construed to include, without limitation, a parent structure having at least one hole or opening suitable for receiving an expandable member. The opening can be a through-hole, blind hole, or other type of hole. In some embodiments, the expandable member can be installed in a structural workpiece, such as a bulkhead, fuselage, engine or other structural member of an aircraft. The expandable members can also be installed in other transportation vehicles (e.g., automobiles, trains, watercraft, and the like), rails such as railroad track rails, medical devices (e.g., implants), bridges (e.g., suspension bridges, beam bridges, truss bridges, etc.), and the like. The workpiece preferably has sufficient mechanical properties such that the installation system 100 can install the expandable member while the member is positioned within the hole of the workpiece. The user may or may not have backside access to the workpiece.

Nose Cap Assembly

Figure 3A:
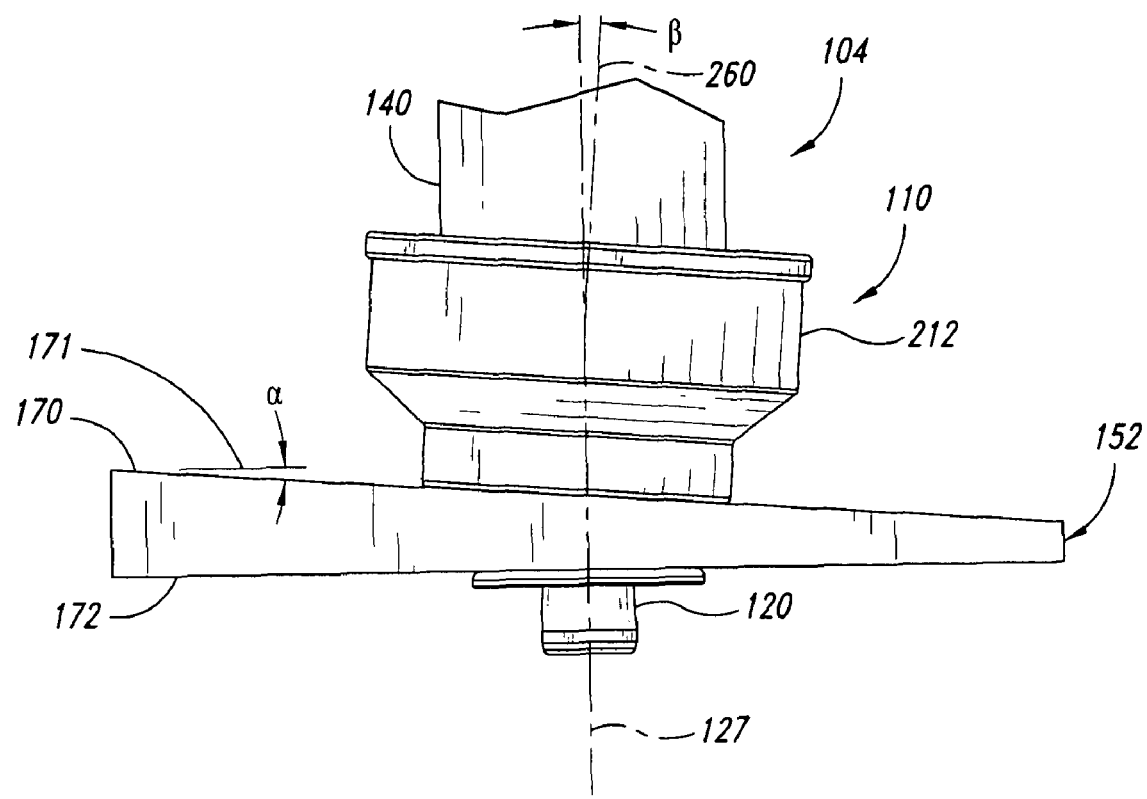
FIG. 3A is a side elevational view of a portion of the installation system of FIG. 1A engaging a workpiece during an installation process.
Figure 3B:
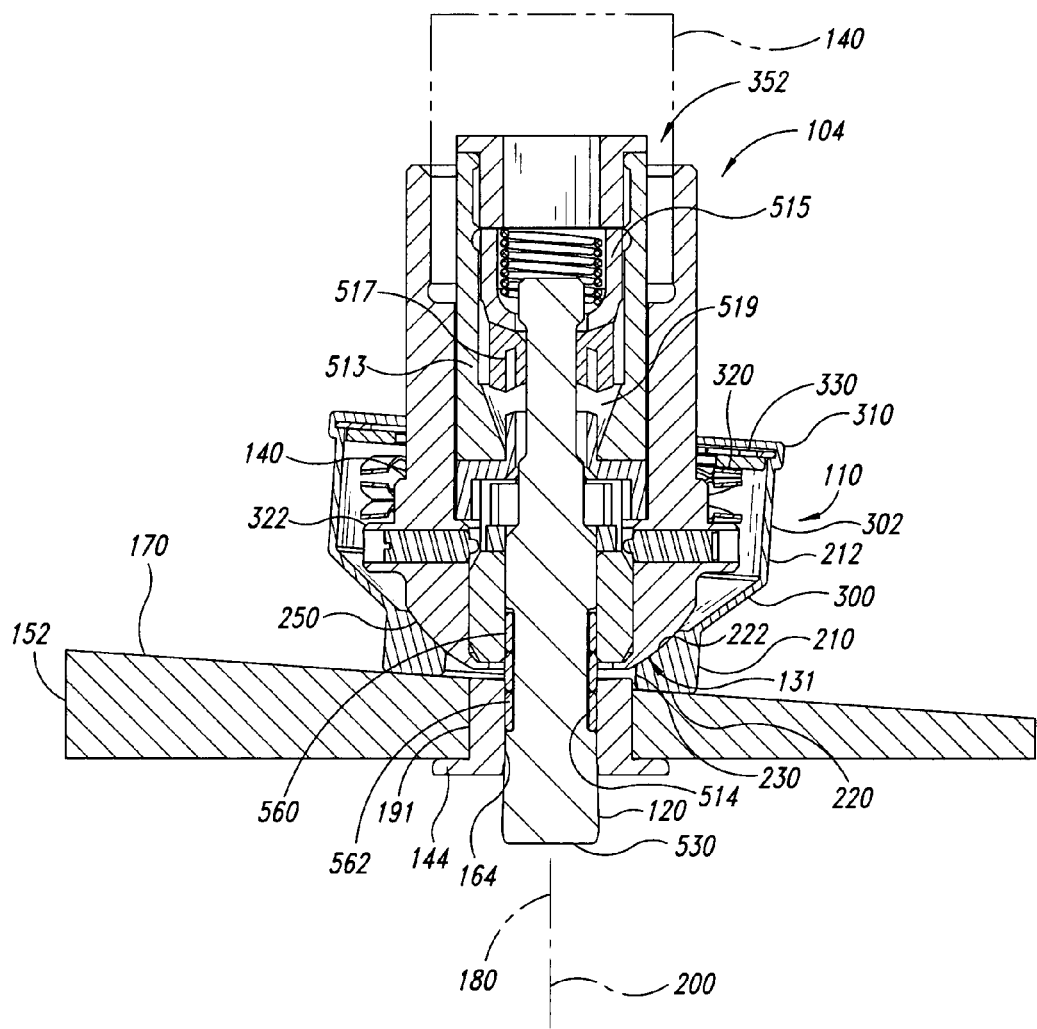
FIG. 3B is a cross-sectional view of the portion of the installation system and workpiece of FIG. 3A where the mandrel extends through an expandable member positioned within the workpiece.

FIGS. 3A and 3B show the nose cap assembly 110 engaging an angled surface 170 of a workpiece 152. Generally, the nose cap assembly 110 includes an outer housing 212, which surrounds at least a portion of the distal tip 140 and a biasing member 320. As shown in FIG. 3B, the outer housing 212 includes an engagement portion 210, a tapered portion 300, and a sidewall 302. The engagement portion 210 contacts the surface 170 of the workpiece 152 and preferably defines an aperture 230 sized to receive the mandrel 120. The tapered portion 300 extends between the engagement portion 210 and sidewall 302. The sidewall 302 is a generally cylindrical body that extends rearwardly from the tapered portion 300 to a mounting portion 310. The biasing member 320 is interposed between a seating portion 322 of the distal tip 140 and a seating portion 330 of the mounting portion 310.

With continued reference to FIG. 3B, the engagement portion 210 is a thickened portion of the housing 212 and defines a first surface 220 for contacting the workpiece 152 and an opposing second surface 222 for slidably engaging the distal tip 140 of the installation tool 104. The aperture 230 extends between the first surface 220 and second surface 222.

The first surface 220 can be a generally flat surface extending continuously and uninterruptedly about the aperture 230. As shown in FIG. 3B, the first surface 220 can rest securely against the surface 170. It is contemplated that the first surface 220 can have other configurations suitable for engaging the workpiece 152.

Figures 3C, 4A:
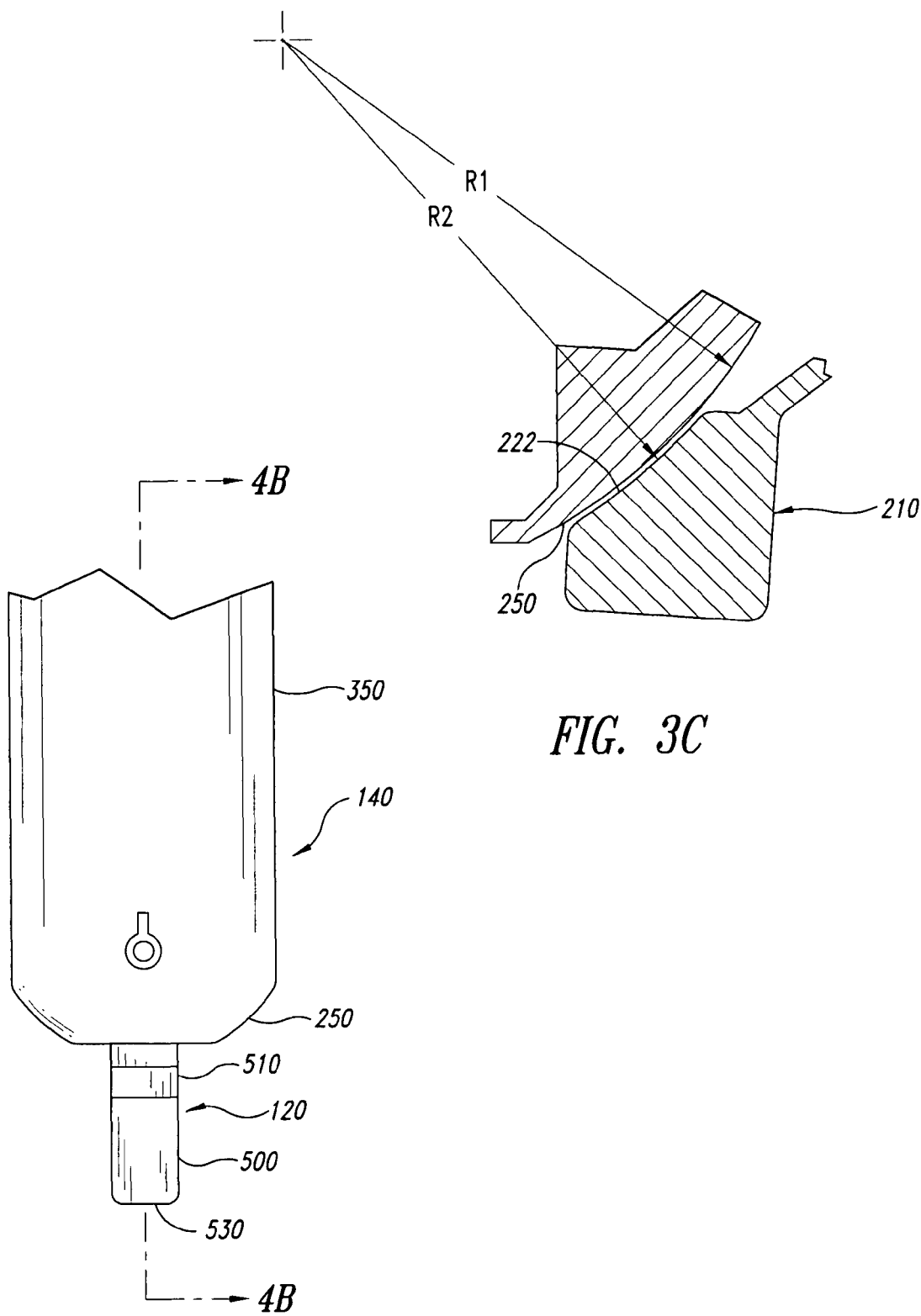
FIG. 3C is an enlarged cross-sectional view of a portion of a distal tip of an installation system and a portion of an engagement portion of the nose cap assembly.
FIG. 4A is a top elevational view of the distal tip of the installation system of FIG. 1A.

The illustrated second surface 222 is a concave surface that mates with the convex surface 250 of the distal tip 140. In some embodiments, at least a portion of the second surface 222 has substantially the same curvature as at least a portion of the outer surface 250. The second surface 222 is preferably a partially spherical surface shaped to generally match the partially spherical surface 250 of the distal tip 140. As shown in FIG. 3C, for example, the radius R1 of the arcuate surface 222 can be generally equal to or slightly greater than the radius R2 of the arcuate surface 250. The surfaces 222, 250 can have other configurations to achieve the desired movement of the nose cap assembly 110. For example, the surfaces 222, 250 may or may not be true geometric spherical surfaces. In some embodiments, the surfaces 222, 250 may be partially ovoid. One of ordinary skill in the art can select the shape of the surfaces 222, 250 to achieve the desired movement between the nose cap assembly 110 and installation tool 104.

When the engagement portion 210 contacts the workpiece 152, the second surface 222 can slide along the outer surface 250 of the distal tip 140 until the mandrel 120 is properly aligned with the expandable member 144. The frictional forces between the surfaces 222, 250 can be reduced or increased to reduce or increase, respectively, the force required to pivot the nose cap assembly 110. In some embodiments, the second surface 222 and outer surface 250 are generally smooth surfaces for reduced frictional forces. For example, the surfaces 222, 250 can be polished surfaces (e.g., highly polished surfaces). In some embodiments, the surfaces 222, 250 are coated with a material, such as a lubricious material. Thus, various types of surface treatments or fabrication techniques can be used to achieve the desired frictional interaction.

The illustrated surface 222 and/or surface 250 can be formed of a polymer, such as synthetic resins like polytetrafluoroethylene (PTFE), TEFLON®, nylon, NEDOX® CR+, blends, mixtures, etc. The entire outer housing 212 can be made of a polymer, such as nylon. Alternatively, the polymer may form a layer that defines the surface 222.

With reference again to FIG. 3B, the tapered portion 300 of the outer housing 212 extends outwardly and rearwardly from the engagement portion 210 to the sidewall 302. In the illustrated embodiment, the tapered portion 300 extends outwardly a sufficient distance to accommodate a positioning system 400 which is described in connection with FIG. 4B.

The sidewall 302 surrounds and protects the distal tip 140 of the installation tool 104. The proximal end of the sidewall 302 forms the mounting portion 310. In the illustrated embodiment, the seating portion 330 extends inwardly from the mounting portion 310 and engages one end of the biasing member 320. The other end of the biasing member 320 engages the seating portion 322. As such, the biasing member 320 is constrained between the seating portions 320, 322.

The illustrated biasing member 320 is a spring in a generally compressed state that applies a proximally directed force to the mounting portion 310, thereby pushing the outer housing 212 in the proximal direction to maintain contact between the nose cap assembly 110 and distal tip 140. The biasing member 320 can provide tactile feedback to the user to facilitate positioning of the installation tool 104. The resistance provided by the biasing member 320 can help a user to controllably align the mandrel 120. Additionally, the biasing member 320 can bias the nose cap assembly 110 to a neutral position (see FIG. 1A). When the nose cap assembly 110 is in the neutral position, a longitudinal axis 260 (FIG. 3A) of the nose cap assembly 110 is generally aligned with a longitudinal axis of the installation tool 104.

To accommodate angled surfaces of workpieces, the nose cap assembly 110 can be configured to rotate an angle β. In some embodiments, the line of action 127 and longitudinal axis 260 of the nose cap assembly 110 defines the angle β. The line of action 127 preferably is a generally linear path. The angle β can be equal to or less than about 1 degree. In some embodiments, the nose cap assembly 110 can be configured to rotate an angle β which is equal to or less than about 2 degrees. In some embodiments, the nose cap assembly 110 can be configured to rotate an angle β which is equal to or less than about 3 degrees. In some embodiments, the nose cap assembly 110 can be configured to rotate an angle β which is equal to or less than about 4 degrees. In some embodiments, the nose cap assembly 110 can be configured to rotate an angle β, which is equal to or less than about 5 degrees, 7.5 degrees, 10 degrees, and 15 degrees. Additionally, other types of mounting arrangements can be used for pivotally mounting the nose cap assembly 110 to the installation tool 104. The range of motion of the nose cap assembly 110 can be selected based on the size and type of expandable members, geometry of the workpiece, and skill level of the installer.

As noted above, the workpiece 152 defines the angled surface 170, i.e., the surface 170 is not perpendicular to a hole or opening 191 in the workpiece 152. The portion of the first surface 170 surrounding the opening 191 and an imaginary plane 171 (FIG. 3A) define an angle α. The imaginary plane 171 is approximately orthogonal to the longitudinal axis of a passageway or through-hole 164 of the expandable member 144 and/or the longitudinal axis of the opening 191 in the workpiece 152. In the illustrated embodiment of FIG. 3B, a longitudinal axis 180 of the passageway 164 of the expandable member 144 and a longitudinal axis 200 of the opening 191 in the workpiece 152 are generally collinear. As shown in FIGS. 3A and 3B, the angle β is preferably equal to the angle α so that the nose cap assembly 110 rests stably against the workpiece 152.

With continued reference to FIG. 3B, the mandrel 120 extends through the aperture 230 of the housing 212. The aperture 230 has an axial cross-section sufficiently large to permit the engagement portion 210 to rest securely against the surface 170 which is angled to a substantially linear path of travel 127 of the mandrel 120. The size of the aperture 230 can be increased or decreased to increase or decrease, respectively, the rotational travel of the nose cap assembly 110. The aperture 230 has a diameter that is generally about at least 3 times the diameter of the portion of the mandrel 120 positioned therein. In other embodiments, the aperture 230 has a width at least about 2.5 times, 2 times, 1.5 times, 1.25 times, or 1.1 times the width of the mandrel 120. The illustrated aperture 230 is a generally circular opening; however, the aperture 230 can have other shapes. For example, the axial cross-section of the aperture 230 can be generally polygonal (including rounded polygonal), elliptical, or other suitable shape for surrounding the mandrel 120.

Distal Tip of the Installation Tool

Figure 4B:
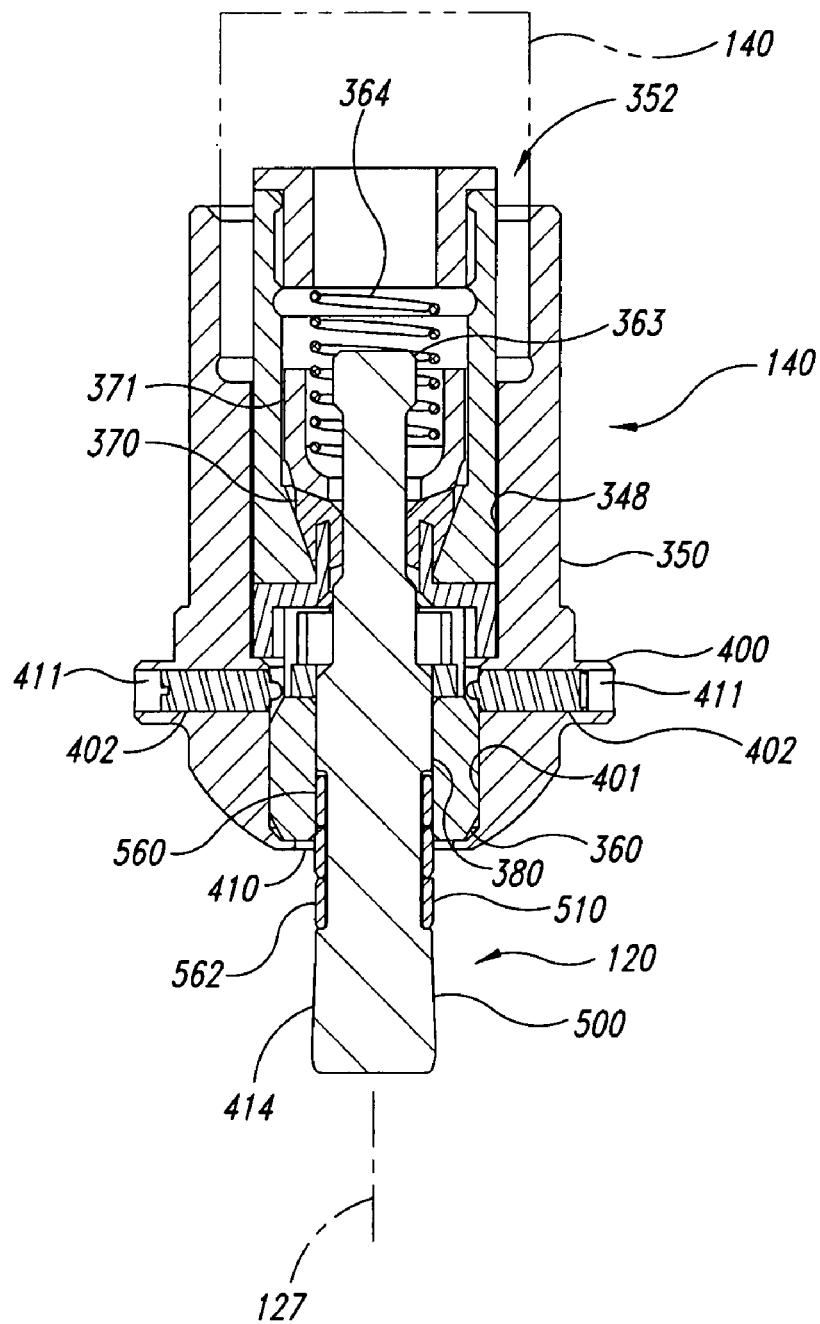
FIG. 4B is a cross-sectional view of the distal tip of FIG. 4A taken along a line 4B-4B.

FIGS. 4A and 4B show the distal tip 140 including a main body 350 defining an opening 410 for receiving the mandrel 120 and the distal surface 250. As shown in FIG. 4B, the main body 350 houses an actuating or drive system 352. A main chamber 348 of the main body 350 can be dimensioned so as to closely receive the actuating system 352 and an alignment disk 360. The main body 350 can also form a portion of the positioning system 400 described further below.

The actuating system 352 is spring-loaded and selectively actuates the mandrel 120 along the line of action 127 when activated. The illustrated actuating system 352 includes a retaining member 370 that grips a coupling end 363 of the mandrel 120. The retaining member 370 bears against a follower 371. An actuating system biasing member 364 engages the retaining member 370. A piston assembly can drive the retaining member 370.

The alignment disk 360 can facilitate proper alignment of the mandrel 120. For example, the alignment disk 360 can be sized to receive and surround at least a portion of the mandrel 120 to inhibit, minimize, or substantially prevent lateral movement of the mandrel 120. As the mandrel 120 is actuated, the alignment disk 360 can thus hold and guide the mandrel 120 along the desired predetermined path. In some embodiments, the mandrel 120 can displace the alignment disk 360 as the mandrel 120 moves axially through the housing 212. Various types of collars, annular members, and the like can be used as an alignment disk 360. Thus, the mandrel 120 can carry the disk 360 through the housing 212.

In the illustrated embodiment of FIG. 4B, the mandrel 120 extends through a passageway 380 of the alignment disk 360. The passageway 380 is preferably sized for closely receiving at least a portion of the mandrel 120. For example, the passageway 380 can have a width that is slightly greater than the width of the mandrel 120 disposed therein. In some embodiments, the width of the passageway 380 is less than about 0.0005 inches (0.013 mm) greater than the width of the portion of the mandrel 120 positioned therein. In other embodiments, the width of the passageway 380 is less than about 0.001 inches (0.025 mm), 0.003 inches (0.076 mm), 0.005 inches (0.127 mm), or 0.01 inches (0.25 mm) greater than the width of the portion of the mandrel 120 positioned therein. In some embodiments, the width of the passageway 380 is less than about 0.5%, 1%, 3%, 5%, or 7% greater than the width of the portion of the mandrel 120 positioned therein. The tolerancing of the passageway 380 and the outside surface of the mandrel 120 can be selected to achieve the desired mandrel alignment and frictional interaction.

The alignment disk 360 can be retained between the actuating system 352 and opening 411. As illustrated in FIG. 4B, the alignment disk 360 is positioned near the opening 411, thereby ensuring proper positioning of the mandrel 120 with respect to an expandable member proximate the opening 411. The alignment disk 360 can be axially retained by the positioning system 400. If the nose cap assembly 110 is separated from the installation tool 104, the system 400 ensures that the disk 360 remains properly positioned within a disk passageway 401. Accordingly, the system 400 can act as a stop that limits the travel of the disk 360 in the proximal direction.

The positioning system 400 can comprise one or more positioning members 402 for controlling movement of the alignment disk 360 relative to the main body 350. In the illustrated embodiment of FIG. 4B, for example, a pair of diametrically opposed pins 402 are axially movable within corresponding through-holes 411 formed in the main body 350.

The pins 402 can be spring-loaded so that they bias inwardly to engage the disk 360. The ends of the pins 402 can protrude into the disk passageway 401 and contact the proximal end of the disk 360. Alternatively, each pin 402 can have an externally threaded surface configured to threadably mate with internal threads of a corresponding through-hole 411. Each pin 402 can be rotated about its longitudinal axis for axial movement along its corresponding through-hole 411. Each pin 402 can be moved independently inwardly and/or outwardly to adjust the position of the alignment disk 360. For example, the pins 402 can be rotated to laterally displace the alignment disk 360.

To install different types or sizes of expandable members, for example, the illustrated mandrel 120 of FIGS. 4A and 4B may be replaced with another mandrel having a different geometry (e.g., a smaller or larger diameter). The illustrated alignment disk 360 may not be suitable for use with the new mandrel. Accordingly, the alignment disk 360 can likewise be replaced so that there is a tight tolerance between the passageway of the alignment disk and an outer surface 414 of the mandrel. The pins 402 can be positioned to accommodate alignment disks of different sizes. The new alignment disk can properly align the new mandrel. Thus, a variety of mandrels and alignment disks can be used with a single installation tool 104 thereby reducing the overall number of components required to install expandable members of different sizes.

Additionally or alternatively, the positioning system 400 of FIG. 4B can be used to adjust the pressure applied by the alignment disk 360 to the outer surface 414 of the mandrel 120. For example, the alignment disk 360 can be a split disk that can be compressed inwardly or expanded outwardly to increase or decrease, respectively, the pressure applied to the outer surface 414 of the mandrel 120. As such, the friction between the alignment disk 360 and mandrel 120 can be selectively adjusted as desired. Further, the split alignment disk 360 can advantageously be used with mandrels having different diameters. The size and type of alignment disks can be selected based on the desired installation procedure and mandrel configuration.

In alternative embodiments, the distal tip 140 is formed by an intermediate component configured to receive the nose cap assembly 110. The intermediate component can be connector, adapter, or other structure of the installation tool 104 for removably or permanently coupling to the nose cap assembly.

Mandrel

Figure 5:
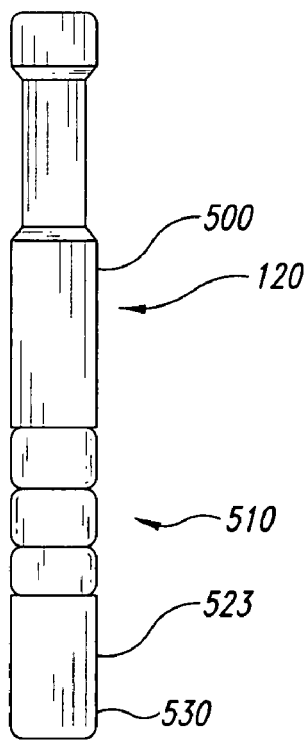
FIG. 5 is a side elevational view of a mandrel having a retention sleeve disposed around a main body, according to one illustrated embodiment.

FIG. 5 shows the mandrel 120 including a main mandrel body 500 and a retention sleeve 510. The retention sleeve 510 can be used to engage at least a portion of an expandable member to inhibit or minimize movement of the expandable member before the expansion process. When the mandrel 120 extends through the expandable member 144, as shown in FIG. 3B, the retention sleeve 510 can extend at least partially through the passageway 164 of the expandable member 144.

Figure 6:
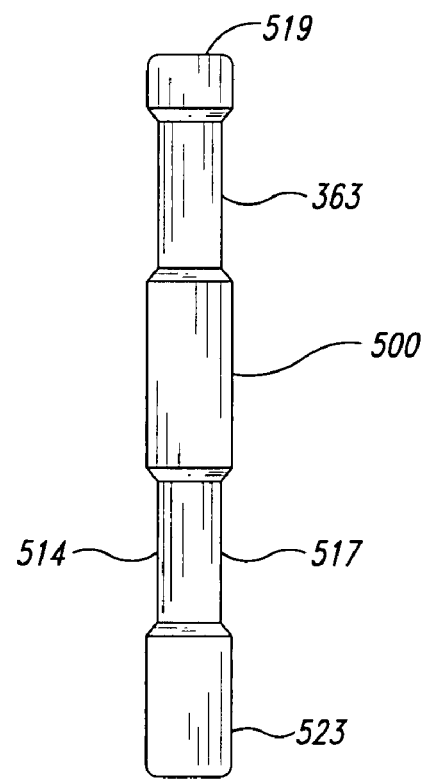
FIG. 6 is a side elevational view of the main body of FIG. 5.
Figure 7:
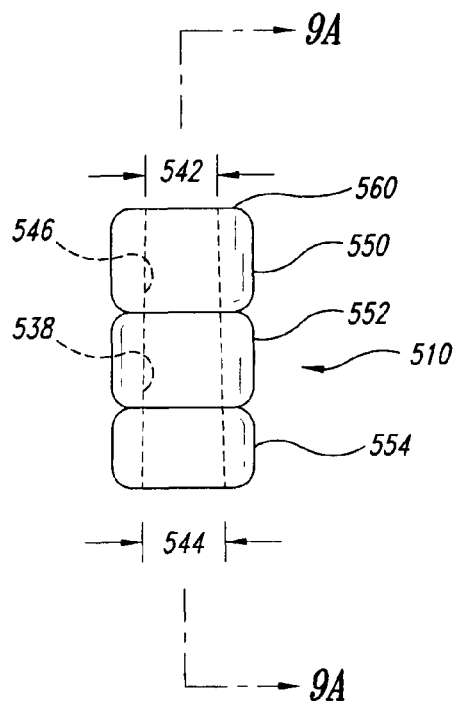
FIG. 7 is a side elevational view of the retention sleeve of FIG. 5.
Figure 8:
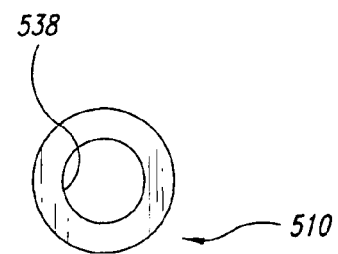
FIG. 8 is a top elevational view of the retention sleeve of FIG. 5.
Figure 9A:
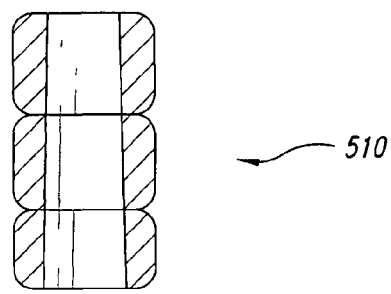
FIG. 9A is a cross-sectional view of the retention sleeve of FIG. 7 taken along a line 9A-9A.
Figure 9B:
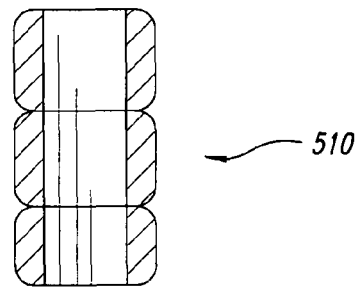
FIG. 9B is a cross-sectional view of a retention sleeve, according to another illustrated embodiment.

FIG. 6 shows the main body 500 including an expansion section 523, the coupling portion 363, and a mounting portion 517 therebetween for engaging the retention sleeve 510 (see FIG. 5). The installation tool 104 can temporarily or permanently receive the coupling section 363. The illustrated coupling section 363 has an enlarged proximal end 519 that can be received by the retaining member 370, as shown in FIG. 4B; however, the coupling section 363 can have other configurations.

The mounting portion 517 is configured to receive at least a portion of the retention sleeve 510. The illustrated mounting portion 517 of FIG. 6 includes a circumferential recess 514 sized to receive a substantial portion of the retention sleeve 510, as shown in FIG. 4B. The depth and length of the recess 514 can be selected based on the thickness and length of the retention sleeve 510.

The retention sleeve 510 is preferably securely retained in the recess 514 when the expandable member is slid on and off of the sleeve 510. In some embodiments, the retention sleeve 510 tightly surrounds the mounting section 517. Adhesives, bonding agents, fasteners, and the like can permanently couple the retention sleeve 510 to the main body 500. In some embodiments, however, the retention sleeve 510 is removably coupled to the main body 500.

As shown in FIGS. 7 to 9A, the retention sleeve 510 can be a generally tubular body. An inner profile 538 of the retention sleeve 510 defines a first inner perimeter 542, a second inner perimeter 544 greater than the first inner perimeter 542, and a transition perimeter 546 extending therebetween. In the illustrated embodiment, the retention sleeve 510 has a somewhat frusta conical shape. However, the sleeve 510 can have a generally uniform cross-section. FIG. 9B, for example, illustrates a tubular sleeve 510 having a substantially constant axial cross-section along its length.

The retention sleeve 510 of FIG. 3B can be configured to retain the expandable member 144 on the mandrel 120 during the entire installation process. The main body 500 causes most or all of the radial expansion of the expandable member 144. Thus, the hands of the operator are free to perform other tasks. The expandable member 144 in a pre-expanded state can be coupled to the retention sleeve 510. The expandable member 144 and mandrel 120 can then be inserted into the opening 191 of the workpiece 152. In the illustrated embodiment of FIG. 4B, the mandrel 120 is positioned such that the upper portion 560 of the retention sleeve 510 engages the alignment disk 360. A lower section 562 of the sleeve 510 can engage at least a portion of the passageway 164 of the expandable member 144. In some embodiments, the expandable member 144 can be captured between the mandrel 120 (e.g., the expansion section 523 of the mandrel 120) and the nose cap assembly 110. The retention sleeve 510 can engage the housing 212, alignment disk 360, or other component of the nose cap assembly 110. The sections 560, 562 can enhance the fit between the alignment disk 360 and expandable member 144, respectively, to improve the overall alignment out of the mandrel 120 and expandable member 144.

The illustrated retention sleeve 510 of FIGS. 7 to 9A includes a plurality of segmented portions 550, 552, 554. The segmented portions 550, 552, 554 are separate annular bodies that can be moved relative to one another. For example, the segmented portions 550, 552, 554 can slide axially along the circumferential recess 514 of the mandrel 120; however, a retention sleeve may have a one-piece construction. FIGS. 10 and 11 show retention sleeves 561 and 563, respectively, that each has a continuous and uninterrupted tubular body.

The retention sleeve 510 can be made of polymers, plastics, rubbers, metals, combinations thereof, or other materials suitable for engaging and holding an expandable member. In some embodiments, the retention sleeve 510 comprises a compliant material. When compressed, the retention sleeve 510 can deform and bulge out around the expandable member 144, as shown in FIG. 3B. The compliant material can thus deform and promote a snug fit for expandable members of different sizes. In some embodiments, the sleeve 510 is made mostly of non-metal, e.g., a polymer material (e.g., nylon, polyurethane, etc.). The retention sleeve 510 can also be constructed from other types of synthetic or natural materials with suitable characteristics. One of ordinary skill in the art can determine the appropriate combination of material type, thickness, and sleeve shape to achieve the desired interaction between the retention sleeve 510 and the expandable member.

With reference again to FIG. 5, the retention sleeve 510 is spaced from a distal end 530 of the mandrel 120. The expansion section 523 of the mandrel 120 extends distally from the retention sleeve 510 and preferably comprises a high wear material, such as metal (e.g., stainless steel, tool steel, titanium), ceramics, and the like. The high wear material can produce most or substantially all of the expansions of the member 144, thereby limiting wear of the mandrel 120.

In some embodiments, the main body 500 can be formed of first material and the retention sleeve 510 can be formed of a second material. The second material can have a modulus of elasticity that is less than the modulus of elasticity of the first material. In some embodiments, the second material can have a modulus of elasticity that is substantially less than the modulus of elasticity of the first material. In one embodiment, for example, the first material comprises mostly metal (e.g., steel, such as tool steel) and the second material comprises mostly plastic (including rubber). Accordingly, the retention sleeve 510 can be substantially more compliant than the main body 500.

A retention sleeve can have a uniform or varying wall thickness. The retention sleeve 561 of FIG. 10 has a wall thickness that gradually increases from a first end 565 to a second end 567. FIG. 11 shows the retention sleeve 563 having a generally uniform wall thickness along its length.

When the retention sleeve 510 is positioned in the expandable member 144, the expandable member 144 can compress the sleeve 510. The compressed sleeve 510 preferably exerts an outwardly directed reactive force against the passageway 164 to ensure that the expandable member 144 is securely retained on the mandrel 120 before, during, and after the expandable member 144 is placed in the opening 191 of the workpiece 152. To expand the expandable member 144, the mandrel 120 can be displaced to dislodge the retention sleeve 510 as discussed below.

Methods of Installing an Expandable Member

FIG. 12 is a flowchart showing a method of installing an expandable member according to one embodiment. At 700, the expandable member 144 is positioned on the mandrel 120 by inserting the coupling end 363 of the mandrel 120 into the passageway 164 of the expandable member 144 in a pre-expanded state. The expandable member 144 is slid distally over the mandrel 120 until at least a portion of the expandable member 144 is fit snuggly around the retention sleeve 510.

At 704, the mandrel 120 and expandable member 144, positioned on the distal side of the workpeice 152, are inserted into the workpiece. At 706, the coupling end 363 of the mandrel 120 protruding outwardly from the workpiece 152 is coupled to the installation tool 104 by inserting the coupling end 363 through the aperture 230 of the nose cap assembly 110. The mandrel 120 is then advanced through the opening 410 of the distal tip 140 until the coupling end 363 is positioned to be coupled to the actuating system 352. When the actuating system 352 is retracted, arms 513, 515 (see FIG. 3B) are moved proximally thereby pushing inwardly the engaging members 517, 519, respectively, against the mandrel 120. In this manner, the actuating system 352 selectively grips the mandrel 120.

After the mandrel 120 is coupled to the installation tool 104, the mandrel 120 and associated expandable member 144 can be aligned with the opening 191 in the workpiece 152. At 706, the mandrel 120 is inserted and advanced through the opening 191 to position at least a portion of the expandable member 144 therein. The opening 191 can closely receive the expandable member 144 to reduce the amount of expansion required to install the expandable member 144, thereby reducing installation time.

At 707, the nose cap assembly 110 can pivot when the front face 220 of the nose cap assembly 110 contacts the workpiece 152. As shown in FIGS. 3A and 3B, at least a portion of the expandable member 144 is within the opening 191 of the workpiece 152 while the expandable member 144 is held securely by the retention sleeve 510. The mandrel 120 and installation tool 104 can be generally aligned with the longitudinal axis 200 of the opening 191 independent of the surface geometry of the workpiece 152.

At 708, the actuating system 352 retracts the mandrel 120 and the alignment disk 360 surrounding the mandrel 360. During the retraction process, the nose cap assembly 110 can remain in generally continuous contact with the workpiece 152. The mandrel 120 is drawn proximally through the expandable member 144 and cap assembly 110 so that the retention sleeve 510 moves proximally out of the expandable member 144.

At 709, the tapered distal expansion section 523 of the mandrel 120 is forcibly pulled through the passageway 164 causing radial expansion of the expandable member 144. During this expansion process, the nose cap assembly 110 is pulled against the workpiece 152 and can rotate to minimize, limit, or prevent non-axial loading of the mandrel 120. The mandrel 120 can thus be in uniaxial tension. If the mandrel 120 is misaligned, for example, the installation tool 104 and mandrel 120 may rotate with respect to the stationary nose cap assembly 110 until the mandrel 120 is brought into proper alignment. Accordingly, the mandrel 120 may be moved into alignment by the forces generated during the expansion process. If side loading occurs, the nose cap assembly 110 can move to minimize or eliminate the side loads. In this manner, stress levels in the installation tool 104, workpiece 152, and expandable member 144 may be minimized, thus reducing wear. The reduced stresses can reduce the frequency of part failure including, but not limited to, braking of the mandrel, damage to the workpiece, and the like. Moreover, the proper orientation of the mandrel 120 may ensure proper positioning of the installed expandable member 144.

The material of the expandable member 144 can be radially displaced into the material of the workpiece 152 that defines the opening 191. Cold working of the expandable member 144 may also cold work the material of the structural workpiece 152 to provide a fatigue benefit by creating compressive, residual stresses in the material surrounding and/or adjacent to the opening 191.

The expandable member 144 is preferably expanded a sufficient amount to secure the expandable member 144 in the opening 191. In some embodiments, an interference fit is formed between the expandable member 144 and workpiece 152; however, other types of fits are also possible.

At 710, the mandrel 120 is removed from the installation tool 104. Optionally, the installation tool 104 or mandrel 120, or both, can be used to install another expandable member. To install different types or sizes of expandable members that require different mandrels, the alignment disk and/or nose cap assembly can be replaced. The installation tool 104 can thus install various types of expandable members in workpieces, which have complex surfaces, such as angled or non-angled surfaces, without requiring indexing or measuring of surface geometries. It is contemplated that the installation system 100 can be used to install expandable members in openings with or without backside access.

Overview of Seating Apparatus

Figure 13:
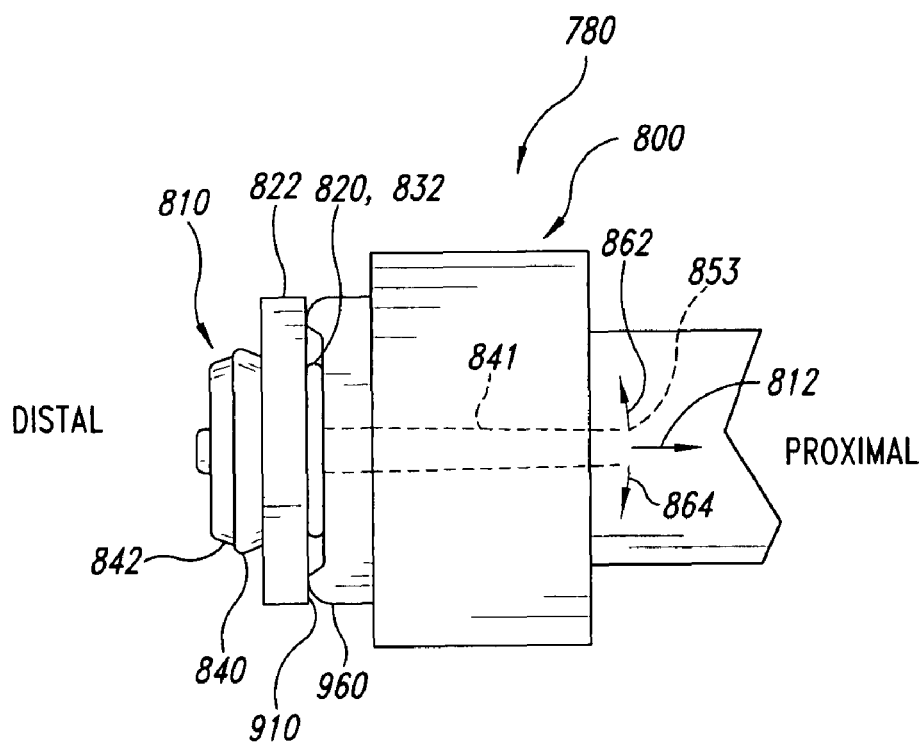
FIG. 13 is a side elevational view of a seating apparatus having a seating assembly and an installation system where an expandable member and workpiece are sandwiched between the seating assembly and installation system, according to one illustrated embodiment.

FIG. 13 illustrates a seating apparatus 780 for adjusting the position of an installed expandable member 820. The seating apparatus 780 includes an installation tool or puller tool 800 removably coupled to a self-aligning seating assembly 810. One or more gaps can be formed between the expandable member 820 and a workpiece 822. These gaps can often lead to undesirable movement between the expandable member 820 and workpiece 822, thereby reducing fatigue performance of the assembled structure or inducing other problems in load transfer or corrosion. The seating apparatus 780 can reposition the installed expandable member 820 (e.g., an expandable member in a post-expanded position) to reduce the size or eliminate one or more of these gaps. Generally, the seating assembly 780 and puller tool 800 are drawn together to apply compressive forces to the expandable member 820 and workpiece 822 in order to reposition the expandable member 820 with respect to the workpiece 822.

The seating apparatus 780 can reposition one or more expandable members that have been dislodged or otherwise moved over time. If the expandable member has moved an undesirable amount, the seating apparatus 780 can move the member to a desired location. An expandable member may be repositioned numerous times during its useful lifetime.

Figure 14:
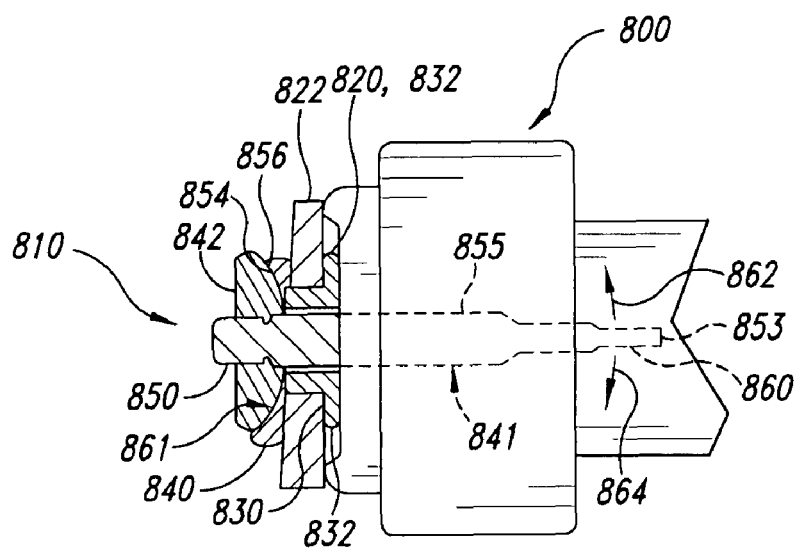
FIG. 14 is a partial cross-sectional view of the seating assembly, workpiece, and expandable member of FIG. 13.

In some embodiments, including the illustrated embodiment of FIG. 14, the expandable member 820 is moved after it has been expanded so as to form a strong interference fit with the workpiece 822. The seating apparatus 780 can also be used to reposition other types of members (including non-expandable members), fitting, and the like in workpieces. The seating assembly 810 and puller tool 800 are discussed separately below.

Seating Assembly

FIGS. 13 and 14 show the seating assembly 810 including a seat base 840, a seat backing 842, and a pull rod 841 extending from the seat backing 842 through the seat base 840. A joint 861 is formed between the seat backing 842 and seat base 840. The seat backing 842 slidably engages the seat base 840 such that the pull rod 841 can be pivoted or rotated with respect to the workpiece 822.

Figure 15:
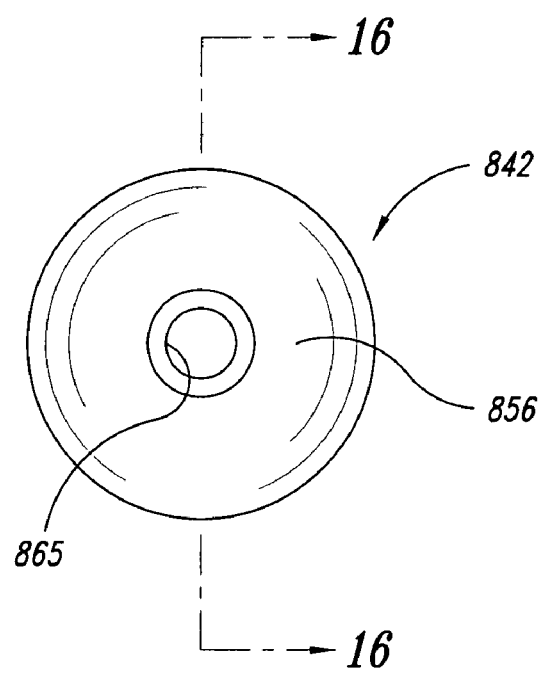
FIG. 15 is a front elevational view of a seat backing of the seating assembly of FIG. 13.
Figure 16:
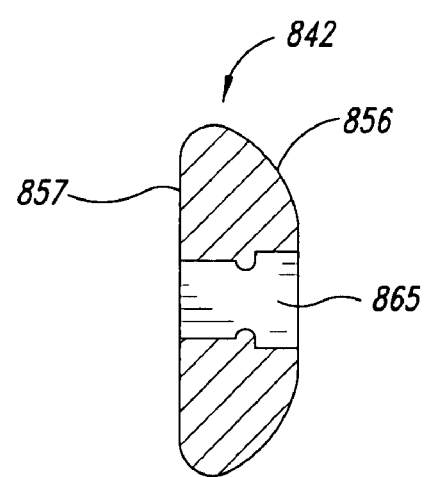
FIG. 16 is a cross-sectional view of the seat backing of FIG. 15 taken along a line 16-16.

With reference to FIGS. 15 and 16, the seat backing 842 is somewhat disk-shaped having an engagement surface 856, a back surface 857 opposing the engagement surface 856, and a passageway 865 extending between the surfaces 856, 857. The passageway 865 is a longitudinally extending passageway sized to receive at least a portion of the rod 841.

Figure 17:
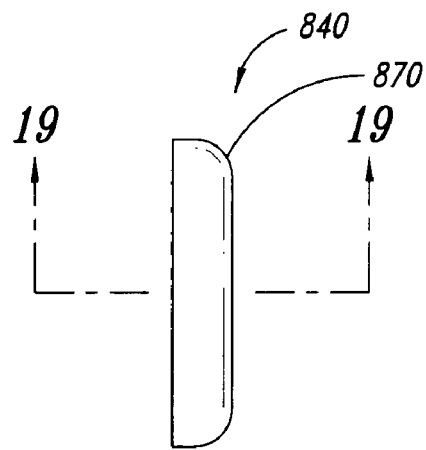
FIG. 17 is a side elevational view of a seat base of the seating assembly of FIG. 13.
Figure 18:
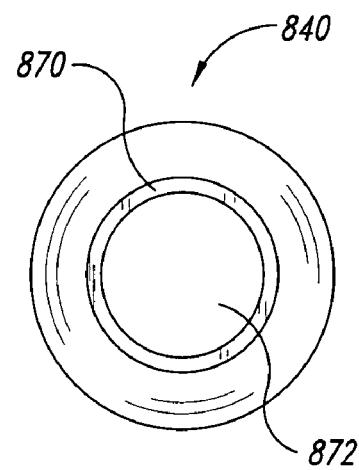
FIG. 18 is a front elevational view of the seat base of FIG. 17.
Figure 19:
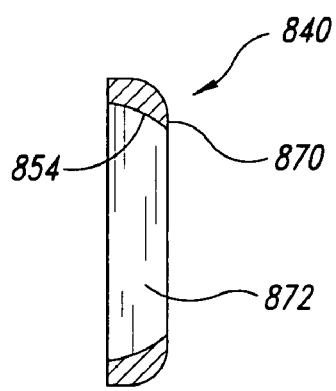
FIG. 19 is a cross-sectional view of the seat base of FIG. 17 taken along a line 19-19 of FIG. 17.

As shown in FIGS. 17 to 19, the seat base 840 is an annular member defining a surface 854 that engages the engagement surface 856 of the seat backing 842. The surfaces 854, 856 can be generally similar to the surfaces 250, 222 described above in connection with FIG. 3B. In some embodiments, for example, the surfaces 854, 856 are generally partially spherical surfaces that have similar radii. The surfaces 854, 856 can also have other configurations.

When the pull rod 841 is pulled proximally (as indicated by the arrow 812 of FIG. 13), the rod 841 can move (e.g., rotate as indicated by the arrows 862, 864 and/or translate) to minimize, limit, or eliminate side loads on the pull rod 841. If the expandable member 820 is installed into a workpiece having a non-uniform thickness, the position of the pull rod 841 can be independent of the geometry (e.g., the surface angle) of the workpiece.

With reference again to FIG. 14, the pull rod 841 includes a seating base end 850, a puller tool end 853, and a main body 855 extending therebetween. The puller tool end 853 is configured for engagement with the puller tool 800.

The seating base end 850 is fixedly coupled to the seat backing 842 by threads, adhesives, fasteners (e.g., mechanical fasteners), or other suitable coupling means. Accordingly, the pull rod 841 and seat backing 842 form a multi-piece structure that can rotate together about the joint 861. Alternatively, the pull rod 841 and seat backing 842 can have a one-piece construction. For example, the pull rod 841 and seat backing 842 can be monolithically formed through a molding and/or machining process.

As shown in FIGS. 17-19, the seat base 840 has a front face 870 for engaging the workpiece 822, the surface 854, and an aperture 872 for receiving the pull rod 841. The size of the aperture 872 can be increased or decreased to increase or decrease, respectively, the travel of the pull rod 841. The aperture 872 can be generally circular, non-circular, polygonal (including rounded polygonal), elliptical or any other shape for the desired range of movement of the pull rod 841.

Puller Tool

The puller tool 800 of FIGS. 13 and 14 can apply a proximally directed force to the rod 841. Various types of puller tools can be used in combination with the seating assembly 810. For example, the puller tool can be the installation tool 104 illustrated in FIGS. 1A-1C. In alternative embodiments, the puller tool can be a pull apparatus as described in U.S. Pat. No. 4,187,708, which is hereby incorporated by reference in its entirety. Other known puller tools can be selected based on the forces required to reposition the expandable members.

Method of Using Seating Apparatus

Figure 20:
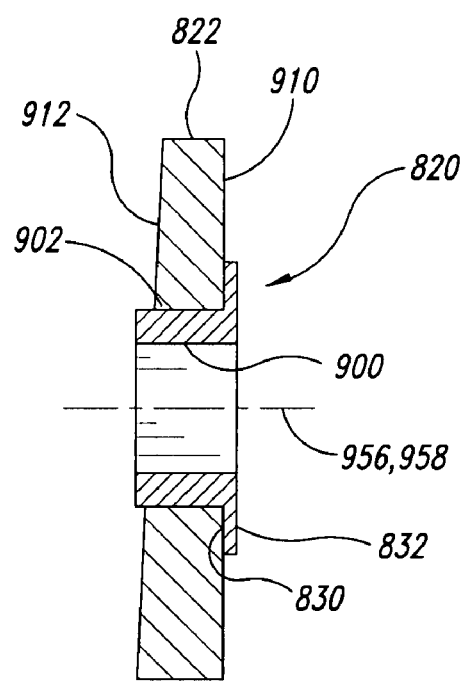
FIG. 20 is a cross-sectional view of an expandable member positioned within an opening of a workpiece.

FIGS. 13, 14, and 20-23 illustrate a method of using the seating assembly 810 according to one embodiment. FIG. 20 shows the expandable member 820 installed in the workpiece 822. The expandable member 820 can be press fit, shrink fit, interference fit, or otherwise coupled to an opening or hole 902 extending through the workpiece 822. The installation system 100 of FIG. 1A can be used to install the expandable member 820. Of course, other types of tools can also be used to install the member 820.

Figure 20A:
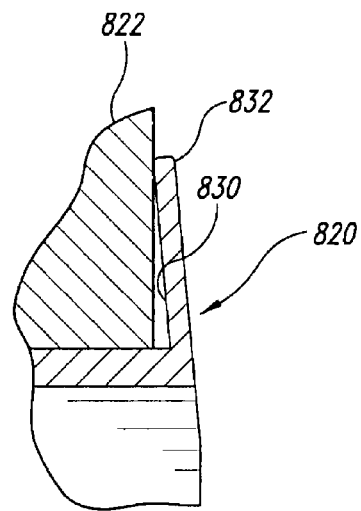
FIGS. 20A-20E are cross-sectional views of expandable members positioned within openings of workpieces.
Figure 20B:
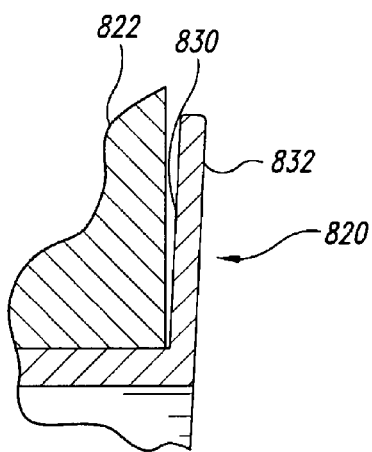
Figure 20C:
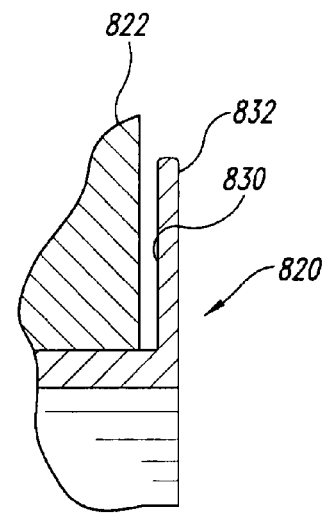
Figure 20D:
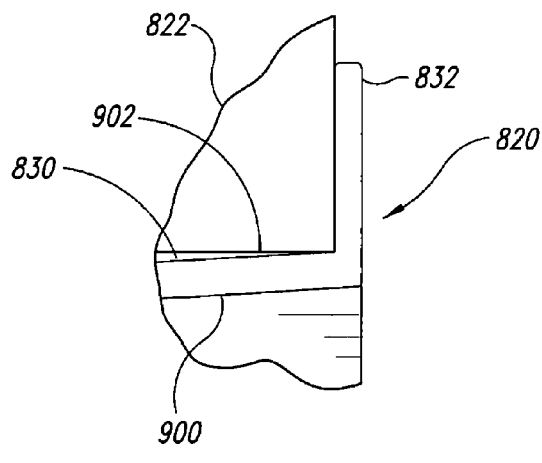
Figure 20E:
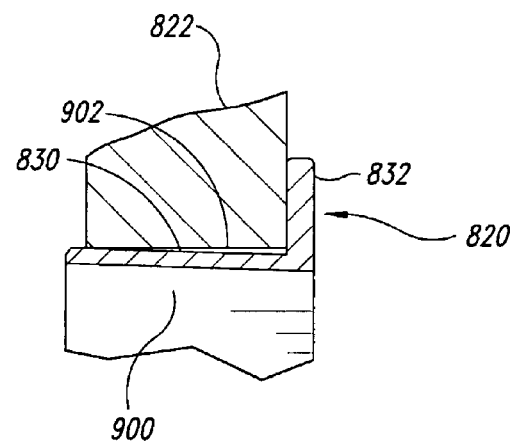

The illustrated workpiece 822 has a first surface 910 and opposing second surface 912 that are non-parallel. The second surface 912 is also not perpendicular with a longitudinal axis 958 (see FIG. 20) of the opening 902. A gap or space 830 is formed between the expandable member 820 and the workpiece 822. The gap 830 is formed between an outwardly or radially extending flange 832 of the expandable member 820 and the first surface 910, although any number of gaps can be present. FIGS. 20A, 20B, and 20C illustrate different types of gaps 830 (e.g., closing angle, open angle, or uniform gap, respectively) that can be formed between the flange 832 and workpiece 822. Additionally, one or more gaps 830 can be formed between a generally tubular body 900 of the member 820 and the opening 902, as shown in FIGS. 20D and 20E.

Figure 21:
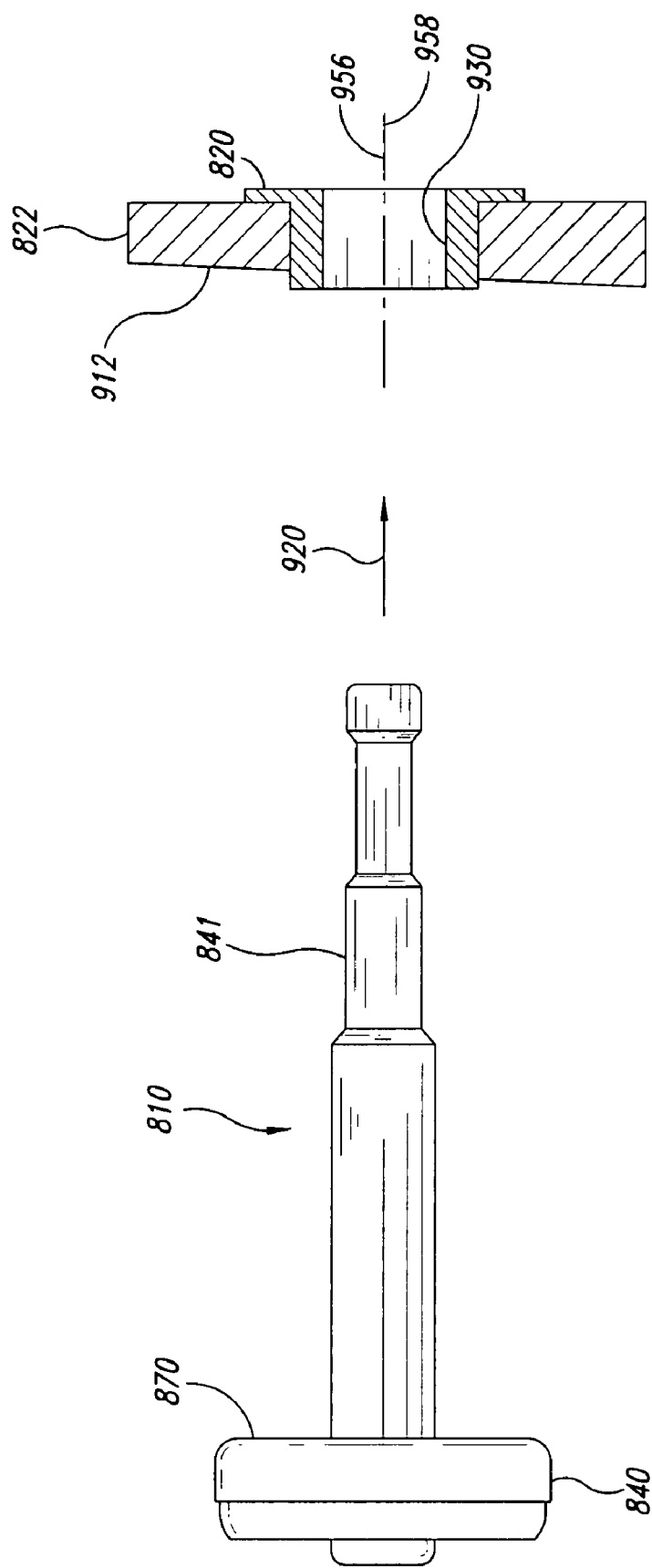
FIG. 21 is a side elevational view of a seating assembly spaced from the expandable member and workpiece of FIG. 20.

FIG. 21 shows a first operation of using the seating assembly 810 to reposition the expandable member 820. The seating assembly 810 is spaced from the expandable member 820 and the workpiece 822. The pull rod 841 can be advanced proximally (indicated by the arrow 920) through a through-hole 930 of the expandable member 820. The pull rod 841 is then advanced proximally such that the front face 870 of the seat base 840 contacts the surface 912 of the workpiece 822.

Figure 22:
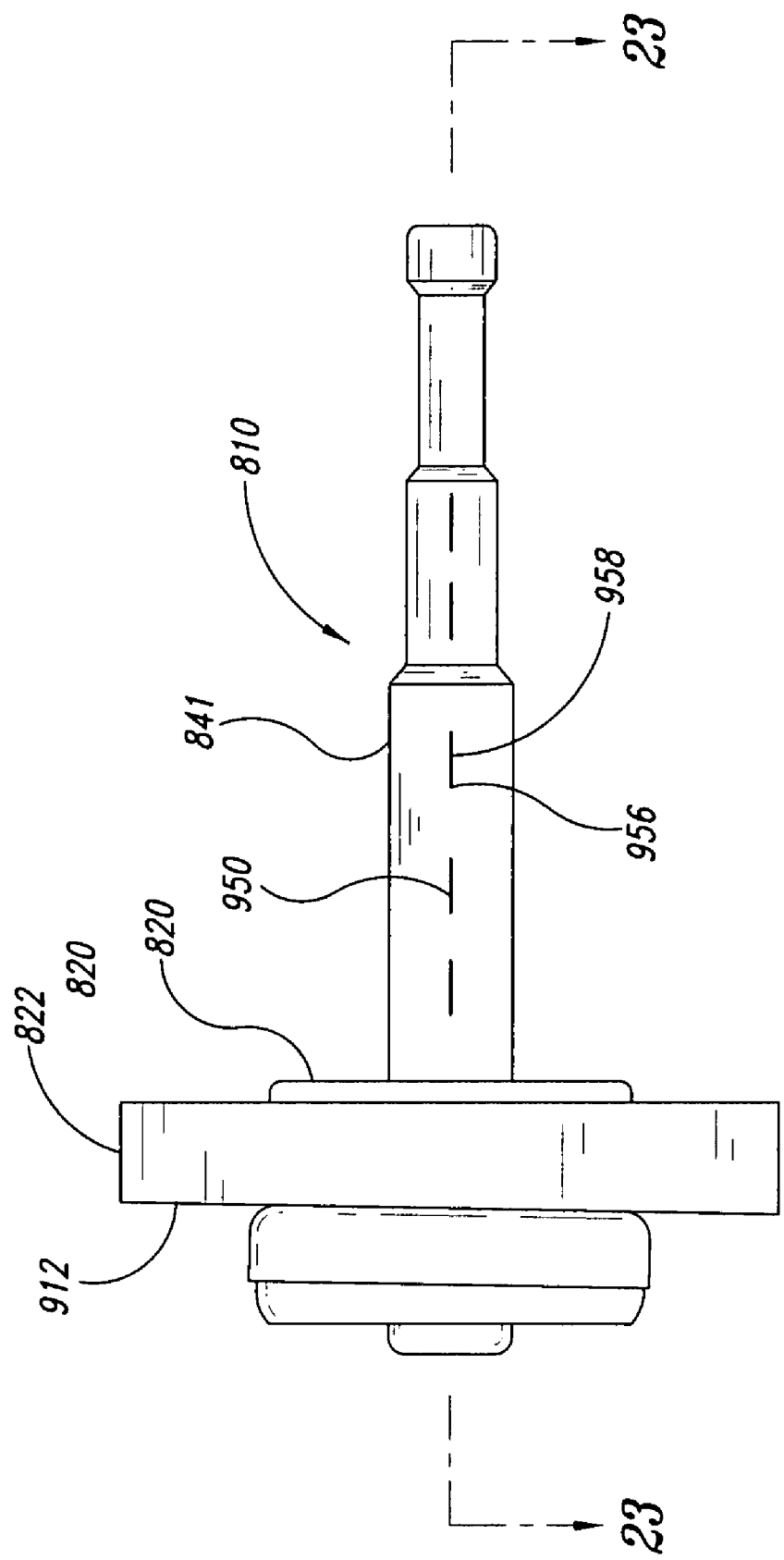
FIG. 22 is a side elevational view of the seating assembly of FIG. 21 having a pull rod extending through the expandable member.

As shown in FIG. 22, when the seat base 840 abuts against the workpiece 822, the pull rod 841 can have a longitudinal axis 950 that is generally collinear with the longitudinal axis 956 (see FIG. 20) of the through-hole 930 and/or the longitudinal axis 958 of the opening 902 in the workpiece 822. In the illustrated embodiment of FIG. 20, the longitudinal axes 956, 958 are generally collinear. The longitudinal axes 956, 958 can also be at other orientations with respect to each other.

Figure 23:
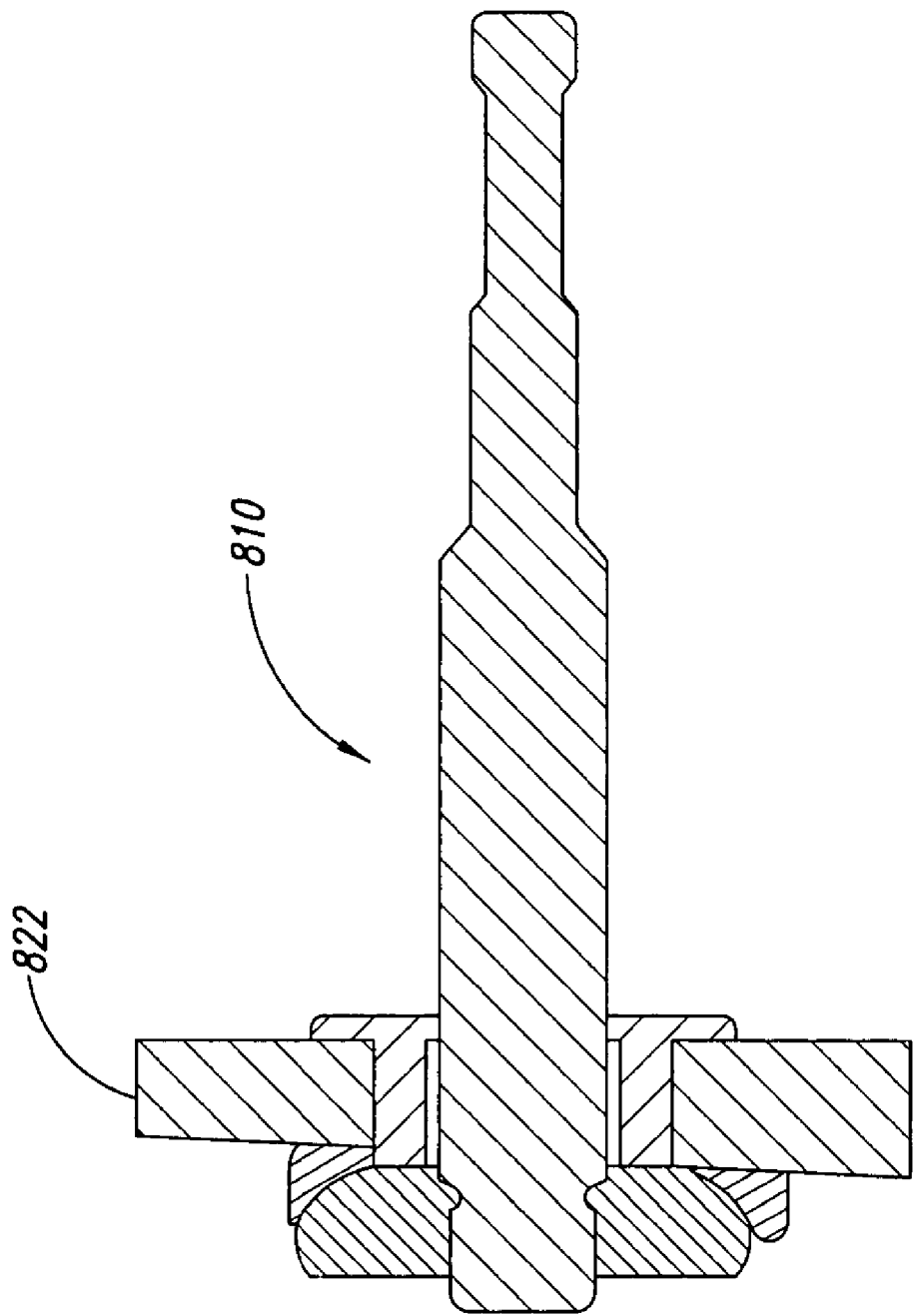
FIG. 23 is a cross-sectional view of the seating assembly, expandable member, and workpiece of FIG. 22 taken along a line 23-23.

After positioning the seat assembly 810 through the expandable member 820, the puller tool end 853 of the rod 841 can be inserted into a puller tool 800. The workpiece 822 and member 820 are thus sandwiched between the seat base 840 and puller tool 800, as shown in FIGS. 22 and 23.

As shown in FIG. 13, when the puller tool 800 applies a proximally directed force 812 to the rod 841, a distal tip 960 of the tool 800 can engage the first surface 910 of the workpiece 822 such that the workpiece 822 remains generally stationary with respect to the tool 800. In other embodiments, the distal tip 960 of the tool 800 can engage the flange 832 to properly seat the flange against the first surface 910 of the workpiece 822. The puller tool 800 and seat assembly 810 are pulled together compressing the expandable member 820 and workpiece 822 therebetween. The compression forces can close any gaps between the member 820 and workpiece 822.

During the compression process, side loads applied to the rod 841 may cause self-centering of the assembly 810. If sufficient side loading occurs, the seat backing 842 can slide with respect to the seat base 840 to minimize or eliminate the side loads. During the compression process, the seating assembly 810 may self align to minimize, limit, or substantially eliminate side loads on the rod 841.

The seating apparatus 780 can be used to reseat expandable members having a flange of other structure on a backside of a workpiece. For example, the seating apparatus 780 of FIG. 13 can reposition the expandable member 820 wherein the flange 832 of the member 820 is adjacent the surface 912 of the workpiece 822.

Figure 24:
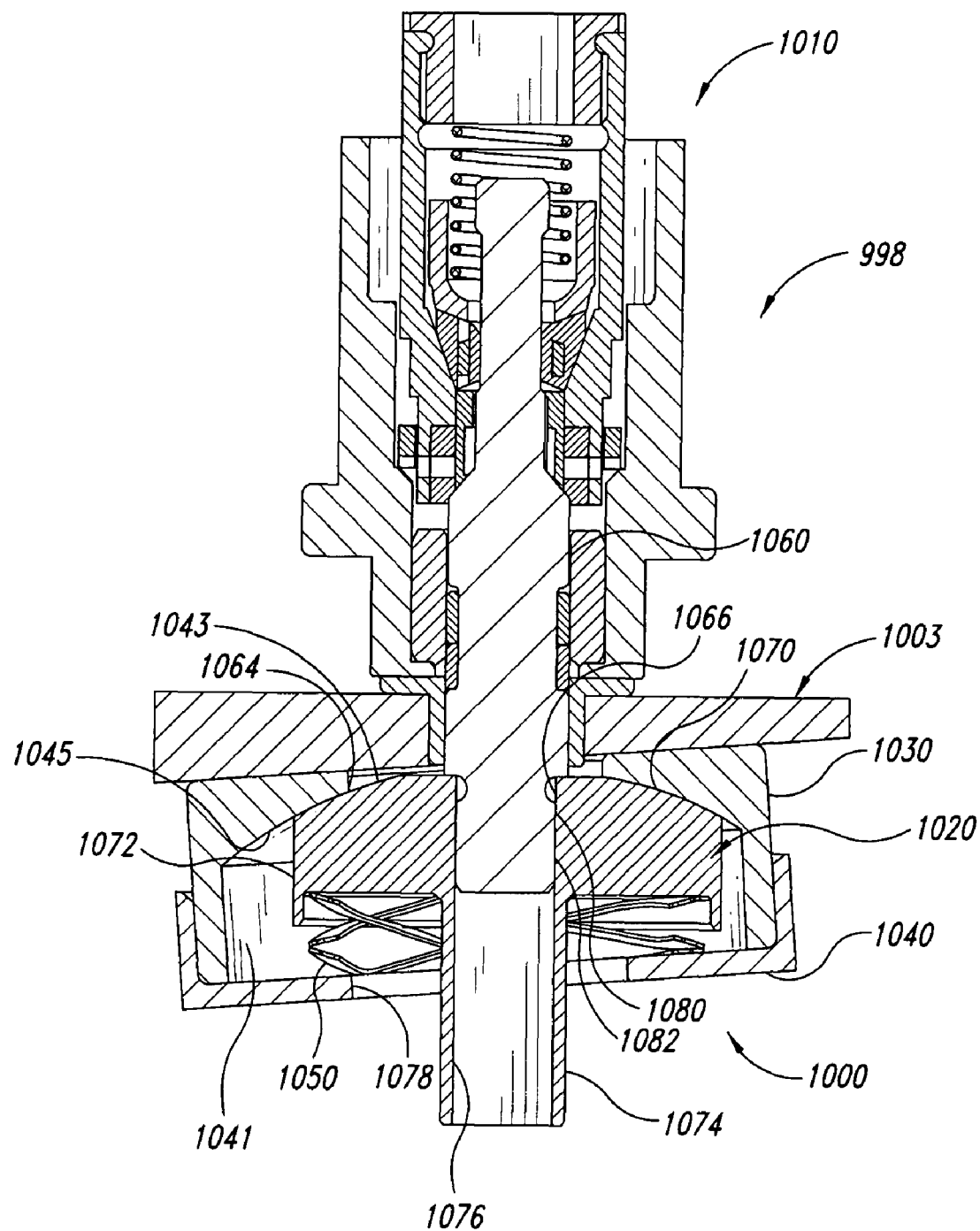
FIG. 24 is a side elevational view of a seating assembly engaging an expandable member which is positioned in a workpiece.

FIG. 24 shows another embodiment of a seating apparatus 998 including a seating assembly 1000 and an installation tool 1010. The seating assembly 1000 is generally similar to the seating assembly 810, except as detailed below.

The seating assembly 1000 has a seat backing 1020 disposed between a seat base 1030 and a cover 1040. A biasing member 1050 extends between and engages the cover 1040 and seat base 1030. A rod 1060 extends through an opening 1064 in the seat base 1030 and an opposing opening 1066 in the seat backing 1020. A joint 1070 is formed between the seat backing 1020 and seat base 1030.

The seat backing 1020 has a main body backing 1072 and an elongate member 1074 extending therefrom. The illustrated elongate member 1074 is a generally tubular member that defines a passageway 1076 sized to receive the end of the rod 1060. When assembled, the elongate member 1074 extends through an opening 1078 in the cover 1040.

The illustrated rod 1060 is threadably coupled to the seat backing 1020. External threads 1080 on the rod 1060 can mate with internal threads 1082 on a passageway 1076. In this manner, the rod 1060 can be rigidly coupled to the seat backing 1020. Other coupling arrangements can be also be used.

The cover 1040 can be temporarily or permanently coupled to the seat base 1030. The cover 1040 and seat base 1030 are sized to form a chamber 1041 suitable for accommodating the seat backing 1020 and rod 1020, even when the seating backing 1020 and rod 1020 are moved.

The biasing member 1050 can press the seat backing 1020 against the seat base 1030, thus ensuring that a surface 1043 of the seat backing 1020 bears properly against a surface 1045 of the seat base 1030. Once the seating system 1000 is separated from the workpiece 1003, the biasing member 1050 can move the seat backing 1020 and rod 1060 to a centered or neutral position.

All patents and publications mentioned herein are hereby incorporated by reference in their entireties. Except as described herein, the embodiments, features, systems, devices, materials, methods and techniques described herein may, in some embodiments, be similar to any one or more of the embodiments, features, systems, devices, materials, methods and techniques described in U.S. Pat. Nos. 3,566,662; 3,892,121; 4,187,708; 4,423,619; 4,425,780; 4,471,643; 4,524,600; 4,557,033; 4,809,420; 4,885,829; 4,934,170; 5,083,363; 5,096,349; 5,405,228; 5,245,743; 5,103,548; 5,127,254; 5,305,627; 5,341,559; 5,380,136; 5,433,100; and in U.S. patent application Ser. Nos. 09/603,857; 10/726,809; 10/619,226; and 10/633,294, which are incorporated herein by reference. In addition, the embodiments, features, systems, devices, materials, methods and techniques described herein may, in certain embodiments, be applied to or used in connection with any one or more of the embodiments, features, systems, devices, materials, methods and techniques disclosed in the incorporated U.S. patents and patent applications.

The articles disclosed herein may be formed through any suitable means. For example, the articles can be formed through injection molding, machining, and other methods disclosed herein. The various methods and techniques described above provide a number of ways to carry out the invention. Of course, it is to be understood that not necessarily all objectives or advantages described may be achieved in accordance with any particular embodiment described herein.

Furthermore, the skilled artisan will recognize the interchangeability of various features from different embodiments disclosed herein. Similarly, the various features and steps discussed above, as well as other known equivalents for each such feature or step, can be mixed and matched by one of ordinary skill in this art to perform methods in accordance with principles described herein. Additionally, the methods which are described and illustrated herein are not limited to the exact sequence of acts described, nor are they necessarily limited to the practice of all of the acts set forth. Other sequences of events or acts, or less than all of the events, or simultaneous occurrence of the events, may be utilized in practicing the disclosed embodiments.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, it is not intended that the invention be limited, except as by the appended claims.

What is claimed is:

1. An apparatus for installing an expandable member in an opening of a workpiece, the apparatus comprising:
    an expansion mandrel sized to fit within a passageway of the expandable member such that the expandable member radially expands when the mandrel moves through the passageway;
    an installation tool coupleable to the expansion mandrel, the installation tool having a distal portion and a drive system, the expansion mandrel moves along a predetermined path when the drive system is activated;
    a self-aligning nose cap assembly having an opening surrounding the expansion mandrel; and
    a joint rotatably coupling the self-aligning nose cap assembly and the installation tool such that the self-aligning nose cap assembly is capable of moving relative to the distal portion of the installation tool and moving laterally relative to the expansion mandrel.

2. The apparatus of claim 1 wherein the distal portion of the installation tool has a curved outer surface, the self-aligning nose cap assembly has an outer surface for engaging the workpiece and an opposing curved surface for sliding along the curved outer surface of the distal portion.

3. The apparatus of claim 1 wherein the distal portion of the installation tool has a partially spherical surface, the self-aligning nose cap assembly has a partially spherical surface that slidably engages the partially spherical surface of the distal portion.

4. The apparatus of claim 1 wherein the joint defines three rotational degrees of freedom.

5. The apparatus of claim 1 wherein the nose cap assembly comprises
    an outer housing dimensioned for rotatably coupling to the distal portion of the installation tool, the distal portion having a curved outer surface; and
    an engagement portion physically connected to the outer housing, the engagement portion defining a first surface, a second surface opposite the first surface, and an aperture extending between the first surface and the second surface, the aperture sized to receive the expansion mandrel, the second surface being curved to slidably engage the curved outer surface of the distal portion.

6. The apparatus of claim 5 wherein an axial cross-section of the aperture is sufficiently large to permit the engagement portion to rest against a surface of the workpiece which is angled to a substantially linear path of travel of the expansion mandrel.

7. The apparatus of claim 6 wherein the surface of the workpiece and the linear path of travel of the expansion mandrel define an angle of at least 3 degrees when the engagement portion is pushed against the surface of the workpiece.

8. The apparatus of claim 5 wherein a curvature of at least a portion of the second surface of the engagement portion is substantially the same as a curvature of at least a portion of the curved outer surface of the distal portion of the installation tool.

9. The apparatus of claim 5 wherein the second surface of the engagement portion comprises a substantially partially spherical surface.

10. The apparatus of claim 1 wherein the expansion mandrel comprises
    a main body having a tapered portion, a mounting portion, and a coupling portion, the mounting portion interposed between the tapered portion and the coupling portion, the tapered portion configured to radially expand the expandable member; and
    a retention sleeve received by the mounting portion of the main body, the retention sleeve positioned along the main body such that the retention sleeve engages at least a portion of the expandable member when the coupling portion of the main body is coupled to the installation tool, the retention sleeve is generally more compressible than the tapered portion of the main body.

11. The apparatus of claim 10 wherein the retention sleeve is made of a first material having a first modulus of elasticity, the tapered portion is made of a second material having a second modulus of elasticity, and the first modulus of elasticity is substantially less than the second modulus of elasticity.

12. The apparatus of claim 10 wherein the main body comprises mostly metal and the retention sleeve comprises mostly plastic.

13. The apparatus of claim 10 wherein the retention sleeve is disposed in a circumferential recess of the mounting portion.

14. The apparatus of claim 10 wherein the retention sleeve is tubular and tightly surrounds the mounting portion.

15. The apparatus of claim 1 wherein the expansion mandrel includes a retention sleeve positioned to contact at least a portion of the expandable member when the expansion mandrel extends through the expandable member and the expansion mandrel is coupled to the installation tool.

16. The apparatus of claim 15 wherein the expansion mandrel includes a tapered portion configured to expand the expandable member, the retention sleeve is more compressible than the tapered portion.

17. The apparatus of claim 1 wherein the expansion mandrel includes a retention sleeve and a main body, the retention sleeve comprises a first material having a first modulus of elasticity, the main body includes a tapered portion for expanding the expandable member, the tapered portion comprises a second material having a second modulus of elasticity, the first modulus of elasticity is substantially less than the second modulus of elasticity.

18. The apparatus of claim 1 wherein the expansion mandrel includes a main body and a retention sleeve, the main body comprises mostly metal, and the retention sleeve comprises mostly plastic.

19. The apparatus of claim 1 wherein the expansion mandrel includes a main body and a retention sleeve which tightly surrounds the main body.

20. The apparatus of claim 1 wherein the distal portion of the installation tool includes a disk passageway and an alignment disk positioned in the disk passageway, the alignment disk surrounds and holds the expansion mandrel.

21. The apparatus of claim 20 wherein the alignment disk closely surrounds the expansion mandrel to keep the expansion mandrel axially aligned with the expandable member as the installation tool moves the expansion mandrel through the expandable member.

22. The apparatus of claim 20 wherein the alignment disk has a passageway, a width of a section of the expansion mandrel positioned in the passageway of the alignment disk is less than 0.01 inches smaller than a width of the passageway of the alignment disk.

23. The apparatus of claim 1 wherein the expansion mandrel extends through the joint.

24. The apparatus of claim 1 wherein the self-aligning nose cap assembly moves laterally relative to the expansion mandrel as the joint assumes different configurations.

25. The apparatus of claim 1 wherein the self-aligning nose cap assembly is capable of rotating to seat an end of the self-aligning nose cap assembly against the workpiece.

26. The apparatus of claim 25 wherein the joint allows the self-aligning nose cap assembly to rotate to define an angle of at least two degrees with respect to a longitudinal axis of the expansion mandrel.

27. An apparatus for expanding an expandable member, the device comprising:
    an installation tool;
    means for expanding the expandable member in a first configuration to a second configuration when the means for expanding is coupled to the installation tool and moved through an opening in the expandable member;
    means for retaining the expandable member in the first configuration on the means for expanding, the means for retaining coupled to the means for expanding;
    a self-aligning nose cap assembly including an opening through which the means for expanding the expandable member extends; and
    a joint that rotatably couples the self-aligning nose cap assembly to the installation tool, the coupling permitting movement of the self-aligning nose cap assembly relative to the installation tool and laterally relative to the means for expanding the expandable member.

28. The apparatus of claim 27 wherein the means for expanding includes a tapered portion configured to expand the expandable member, the tapered portion is less compressible than at least a portion of the means for retaining the expandable member.

29. The apparatus of claim 27 wherein the means for retaining tightly surrounds the means for expanding.

30. The apparatus of claim 27 wherein the means for expanding radially expands the expandable member when the means for retaining is spaced apart from the expandable member.

31. An apparatus for installing an expandable member in an opening of a workpiece, the apparatus comprising:
    an expansion mandrel including a main body and a retention sleeve coupled to the main body, the main body configured to expand the expandable member;
    an installation tool coupleable to the expansion mandrel and including a distal portion;
    a self-aligning nose cap assembly having an opening surrounding the expansion mandrel; and
    a joint configured to allow the self-aligning nose cap assembly to move relative to both the installation tool and the retention sleeve of the expansion mandrel.

32. The apparatus of claim 31 wherein the self-aligning nose cap assembly is movable laterally relative to the retention sleeve of the expansion mandrel to permit the joint to assume different configurations.

33. The apparatus of claim 31, wherein the expansion mandrel is configured to self-align the nosecap when the expansion mandrel is positioned within an opening of the expandable member.

* * * * *